(12) United States Patent
Yao et al.

(10) Patent No.: US 12,086,540 B2
(45) Date of Patent: Sep. 10, 2024

(54) MACHINE LEARNING TECHNIQUES FOR GENERATING DOMAIN-AWARE SENTENCE EMBEDDINGS

(71) Applicant: UnitedHealth Group Incorporated, Minnetonka, MN (US)

(72) Inventors: Chen Yao, Bloomingdale, IL (US); Richard W. Jones, Gilbert, AZ (US); Michael T. McShane, Cambridge, MA (US)

(73) Assignee: UnitedHealth Group Incorporated, Minnetonka, MN (US)

( * ) Notice: Subject to any disclaimer, the term of this patent is extended or adjusted under 35 U.S.C. 154(b) by 293 days.

(21) Appl. No.: 17/510,875

(22) Filed: Oct. 26, 2021

(65) Prior Publication Data

US 2023/0130974 A1     Apr. 27, 2023

(51) Int. Cl.
    *G06F 40/20*         (2020.01)
    *G06N 5/02*         (2023.01)
    *G06N 5/04*         (2023.01)
    *G06N 20/00*        (2019.01)

(52) U.S. Cl.
    CPC ............... *G06F 40/20* (2020.01); *G06N 5/02* (2013.01); *G06N 5/04* (2013.01); *G06N 20/00* (2019.01)

(58) Field of Classification Search
    CPC . G06F 40/20; G06N 5/02; G06N 5/04; G06N 20/00
    USPC .............................. 704/9, 231–232, 236–239
    See application file for complete search history.

(56) References Cited

U.S. PATENT DOCUMENTS

| | | |
|---|---|---|
| 10,380,259 B2 | 8/2019 | Lee et al. |
| 10,482,384 B1 | 11/2019 | Stoilos et al. |
| 10,691,998 B2 | 6/2020 | Po et al. |
| 10,885,281 B2 | 1/2021 | Stoyanovsky et al. |
| 11,042,712 B2 | 6/2021 | Prakash et al. |
| 2019/0034416 A1 | 1/2019 | Al Hasan et al. |
| 2020/0097814 A1 | 3/2020 | Devesa |
| 2020/0211709 A1 | 7/2020 | Devesa |
| 2021/0082585 A1 | 3/2021 | Wang et al. |
| 2021/0209500 A1 | 7/2021 | Hu et al. |

FOREIGN PATENT DOCUMENTS

WO     2018/035139 A1     2/2018

OTHER PUBLICATIONS

International Search Report and Written Opinion for International Application No. PCT/US2022/047643, dated Feb. 16, 2023, (12 pages), European Patent Office, Rijswijk, Netherlands.

(Continued)

*Primary Examiner* — George C Monikang
(74) *Attorney, Agent, or Firm* — Alston & Bird LLP

(57) ABSTRACT

Various embodiments of the present invention provide methods, apparatus, systems, computing devices, computing entities, and/or the like for perform predictive data analysis operations using natural language input data. For example, certain embodiments of the present invention utilize systems, methods, and computer program products that perform predictive data analysis operations by using sentence embedding machine learning models that are trained in coordination with similarity-based machine learning models.

20 Claims, 11 Drawing Sheets

(56) References Cited

OTHER PUBLICATIONS

Radev, Dragomir R. et al. "Centroid-Based Summarization Of Multiple Documents: Sentence Extraction, Utility-Based Evaluation and User Studies," NAACL-ANLP-AutoSum '00: Proceedings of the 2000 NAACL-ANLPWorkshop On Automatic Summarization, vol. 4, Apr. 2000, pp. 21-30, DOI: 10.3115/1117575.1117578.
Zheng, Hao et al. "Sentence Centrality Revisited For Unsupervised Summarization," Proceedings of the 57th Annual Meeting Of The Association For Computational Linguistics, Jul. 2019, pp. 6236-6247, XP093021829, DOI: 10.18653/v1/P19-1628.
Kumar, Vivek et al. "Ensembling Classical Machine Learning and Deep Learning Approaches For Morbidity Identification From Clinical Notes," IEEE Access, Dec. 8, 2020, vol. 9, pp. 7107-7126, DOI: 10.1109/ACCESS.2020.3043221.
Liu, Feifan et al. "Learning For Biomedical Information Extraction—Methodological Review of Recent Advances," arXiv preprint arXiv:1606.07993, Jun. 26, 2016 (21 pages).
Van De Schoot, Rens et al. "An Open Source Machine Learning Framework For Efficient and Transparent Systematic Reviews," Nature Machine Intelligence, Feb. 2021, vol. 3, No. 2, pp. 125-133, DOI: 10.1038/s42256-020-00287-7.

FIG. 11

MACHINE LEARNING TECHNIQUES FOR GENERATING DOMAIN-AWARE SENTENCE EMBEDDINGS

BACKGROUND

Various embodiments of the present invention address technical challenges related to performing predictive data analysis operations using natural language input data and address the efficiency and reliability shortcomings of existing natural language processing solutions.

BRIEF SUMMARY

In general, embodiments of the present invention provide methods, apparatus, systems, computing devices, computing entities, and/or the like for perform predictive data analysis operations using natural language input data. For example, certain embodiments of the present invention utilize systems, methods, and computer program products that perform predictive data analysis operations by using sentence embedding machine learning models that are trained in coordination with similarity-based machine learning models.

In accordance with one aspect, a method is provided. In one embodiment, the method comprises: for each sentence of a plurality of sentences, generating a sentence embedding by using a sentence embedding machine learning model and based at least in part on the sentence, wherein: (i) the plurality of sentences comprise the one or more first sentences and the one or more second sentences, and (ii) the sentence embedding machine learning model is generated by updating parameters of an initial sentence embedding machine learning model based at least in part on a similarity determination model error measure that is determined based at least in part on similarity determination model outputs of a sentence similarity determination machine learning model; for each sentence pair comprising a first sentence and a second sentence, determining, based at least in part on the sentence embedding for the first sentence and the sentence embedding for the second sentence, and using the sentence similarity determination machine learning model, an inferred similarity measure for the sentence pair; generating, based at least in part on each inferred similarity measure, a predictive output; and performing one or more prediction-based actions based at least in part on the predictive output.

In accordance with another aspect, a computer program product is provided. The computer program product may comprise at least one computer-readable storage medium having computer-readable program code portions stored therein, the computer-readable program code portions comprising executable portions configured to: for each sentence of a plurality of sentences, generate a sentence embedding by using a sentence embedding machine learning model and based at least in part on the sentence, wherein: (i) the plurality of sentences comprise the one or more first sentences and the one or more second sentences, and (ii) the sentence embedding machine learning model is generated by updating parameters of an initial sentence embedding machine learning model based at least in part on a similarity determination model error measure that is determined based at least in part on similarity determination model outputs of a sentence similarity determination machine learning model; for each sentence pair comprising a first sentence and a second sentence, determine, based at least in part on the sentence embedding for the first sentence and the sentence embedding for the second sentence, and using the sentence similarity determination machine learning model, an inferred similarity measure for the sentence pair; generate, based at least in part on each inferred similarity measure, a predictive output; and perform one or more prediction-based actions based at least in part on the predictive output.

In accordance with yet another aspect, an apparatus comprising at least one processor and at least one memory including computer program code is provided. In one embodiment, the at least one memory and the computer program code may be configured to, with the processor, cause the apparatus to: for each sentence of a plurality of sentences, generate a sentence embedding by using a sentence embedding machine learning model and based at least in part on the sentence, wherein: (i) the plurality of sentences comprise the one or more first sentences and the one or more second sentences, and (ii) the sentence embedding machine learning model is generated by updating parameters of an initial sentence embedding machine learning model based at least in part on a similarity determination model error measure that is determined based at least in part on similarity determination model outputs of a sentence similarity determination machine learning model; for each sentence pair comprising a first sentence and a second sentence, determine, based at least in part on the sentence embedding for the first sentence and the sentence embedding for the second sentence, and using the sentence similarity determination machine learning model, an inferred similarity measure for the sentence pair; generate, based at least in part on each inferred similarity measure, a predictive output; and perform one or more prediction-based actions based at least in part on the predictive output.

BRIEF DESCRIPTION OF THE DRAWINGS

Figure 1:
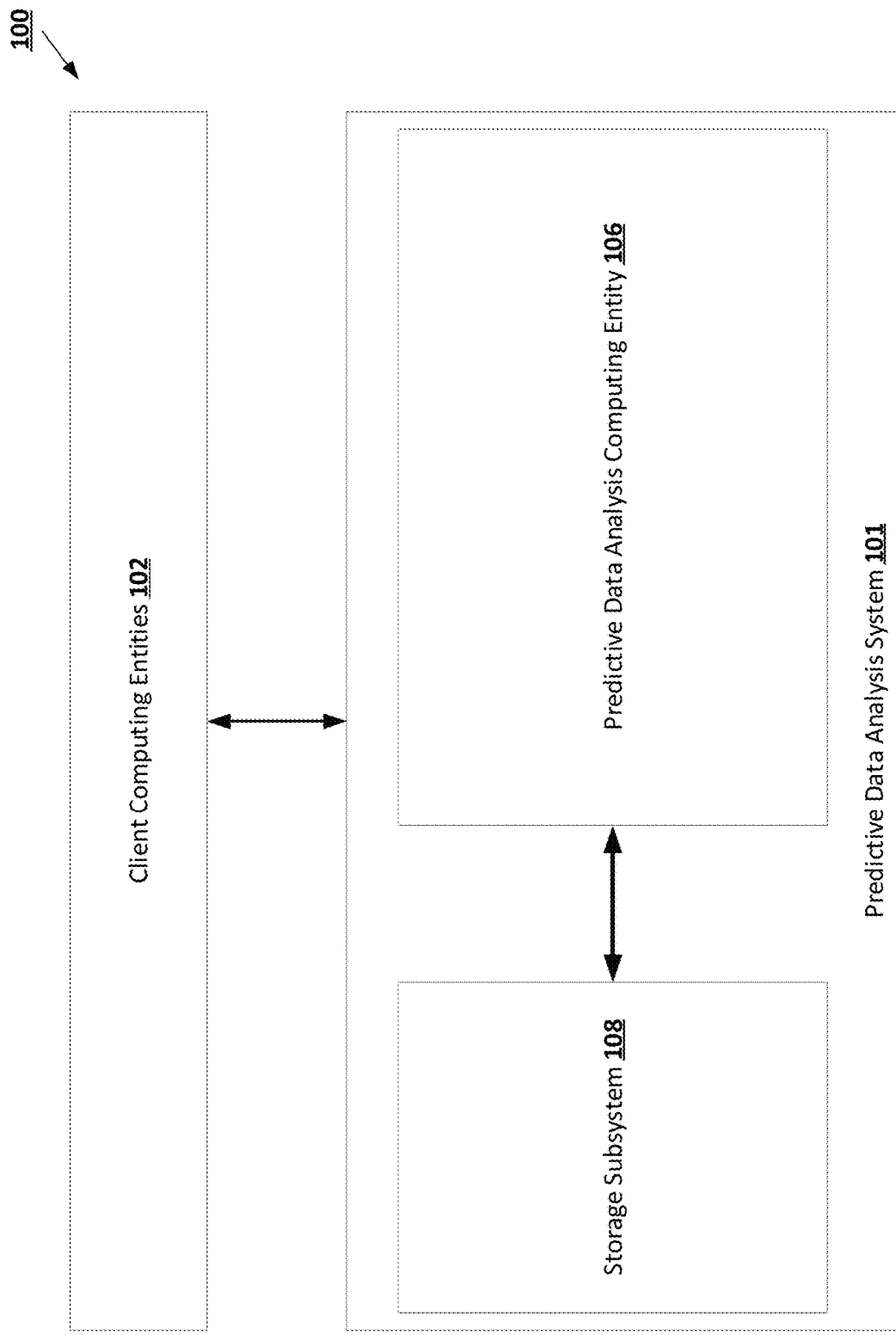

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
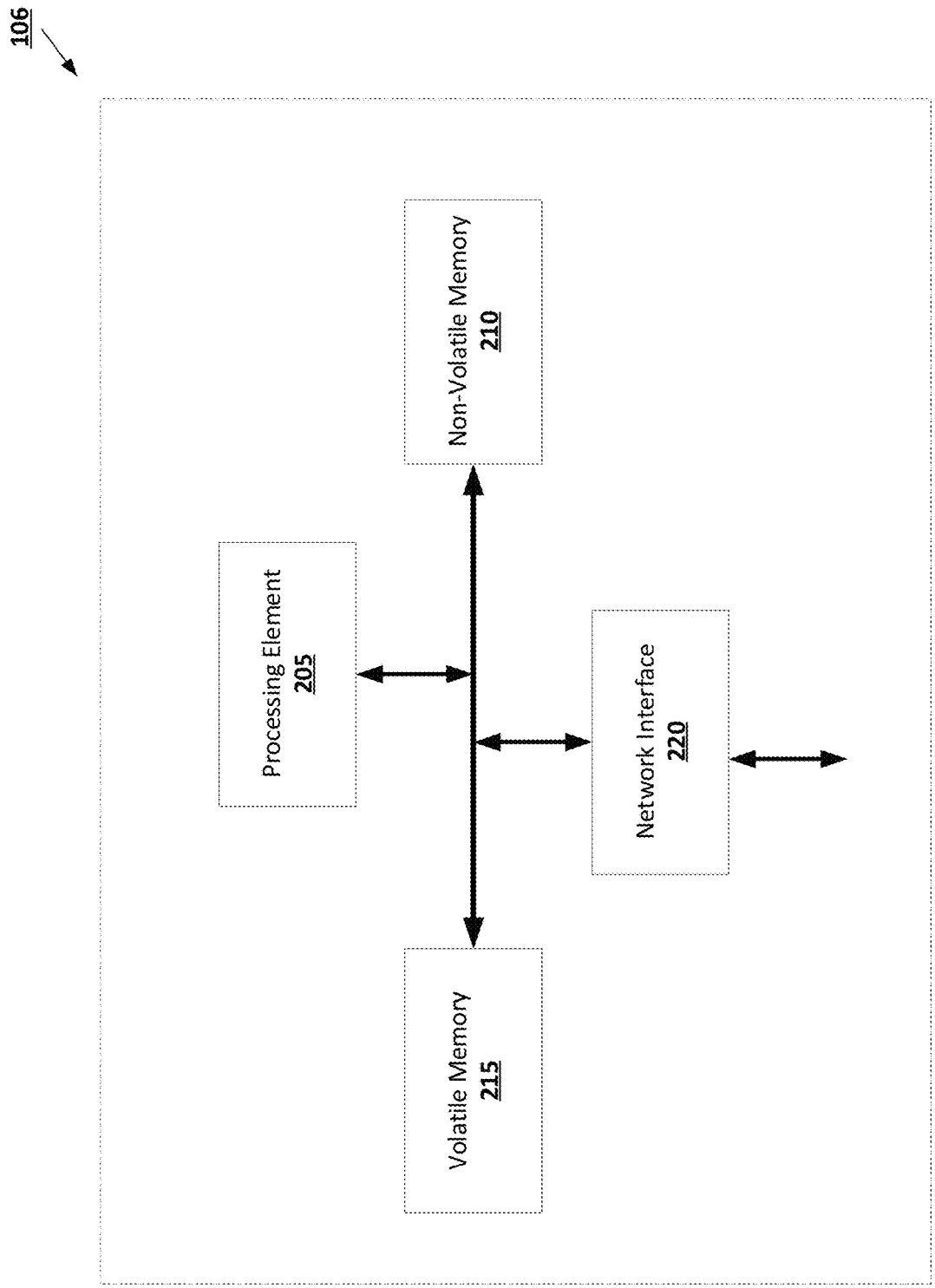

FIG. 2 provides an example predictive data analysis computing entity in accordance with some embodiments discussed herein.

Figure 3:
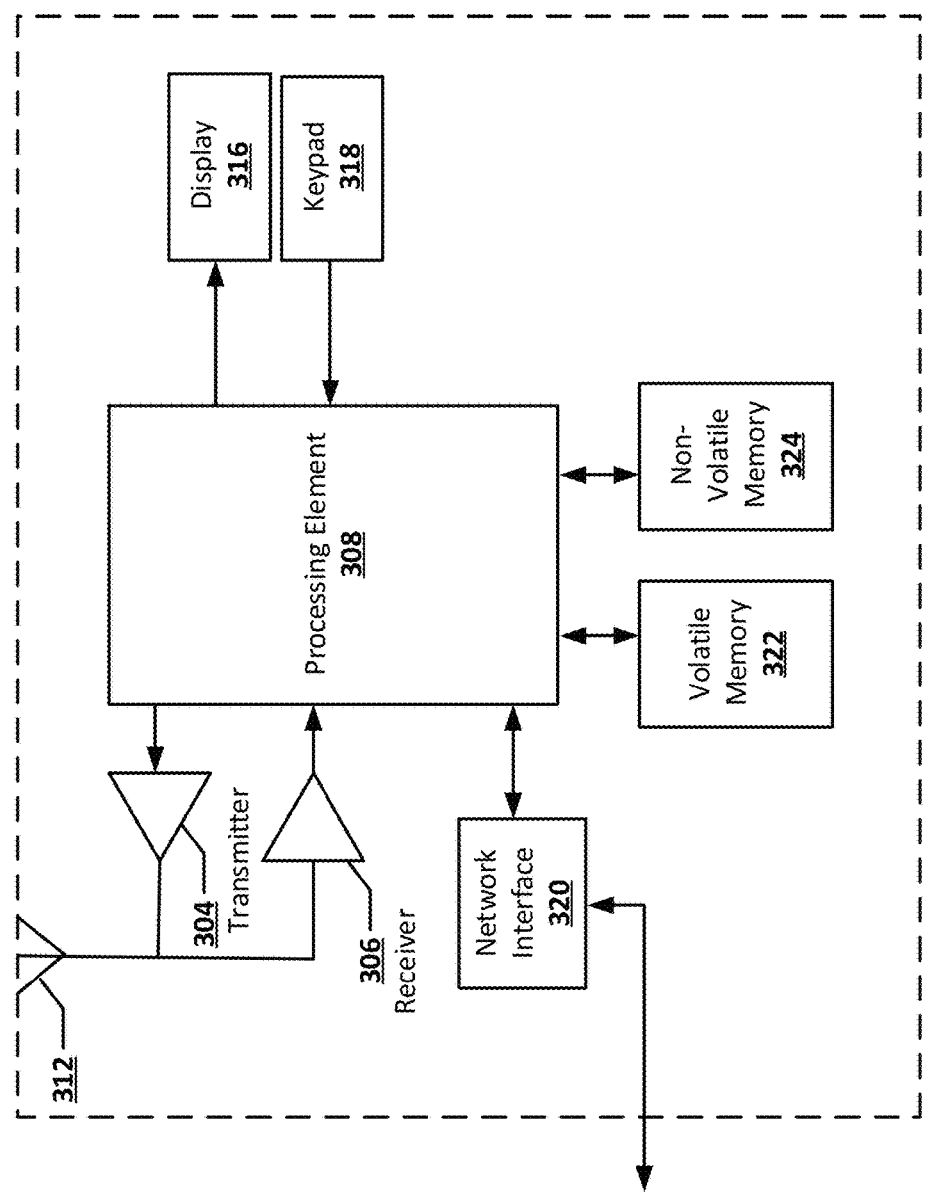

FIG. 3 provides an example client computing entity in accordance with some embodiments discussed herein.

Figure 4:
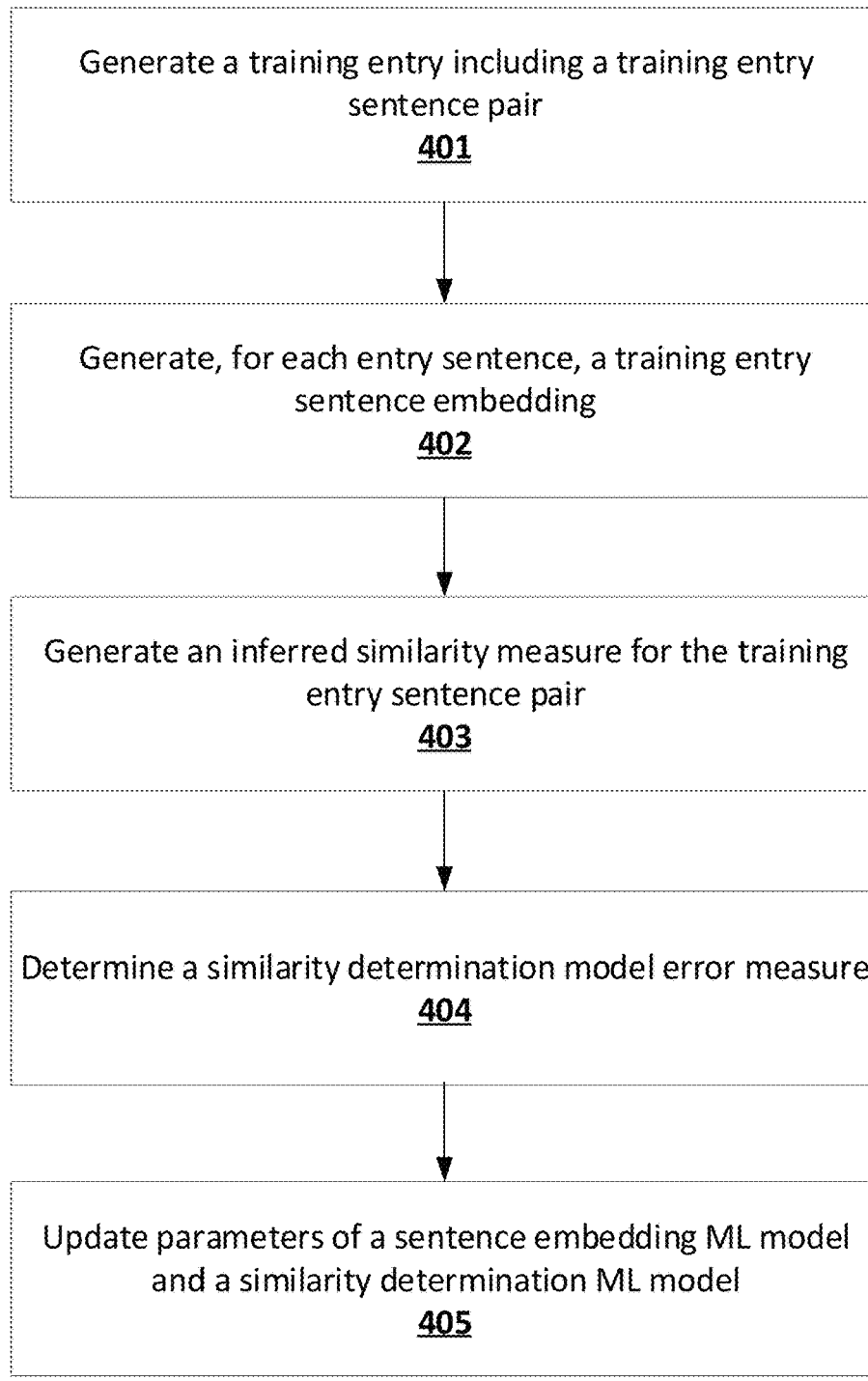

FIG. 4 is a flowchart diagram of an example process for generating a sentence embedding machine learning model in coordination with a sentence similarity determination machine learning model in accordance with some embodiments discussed herein.

Figure 5:
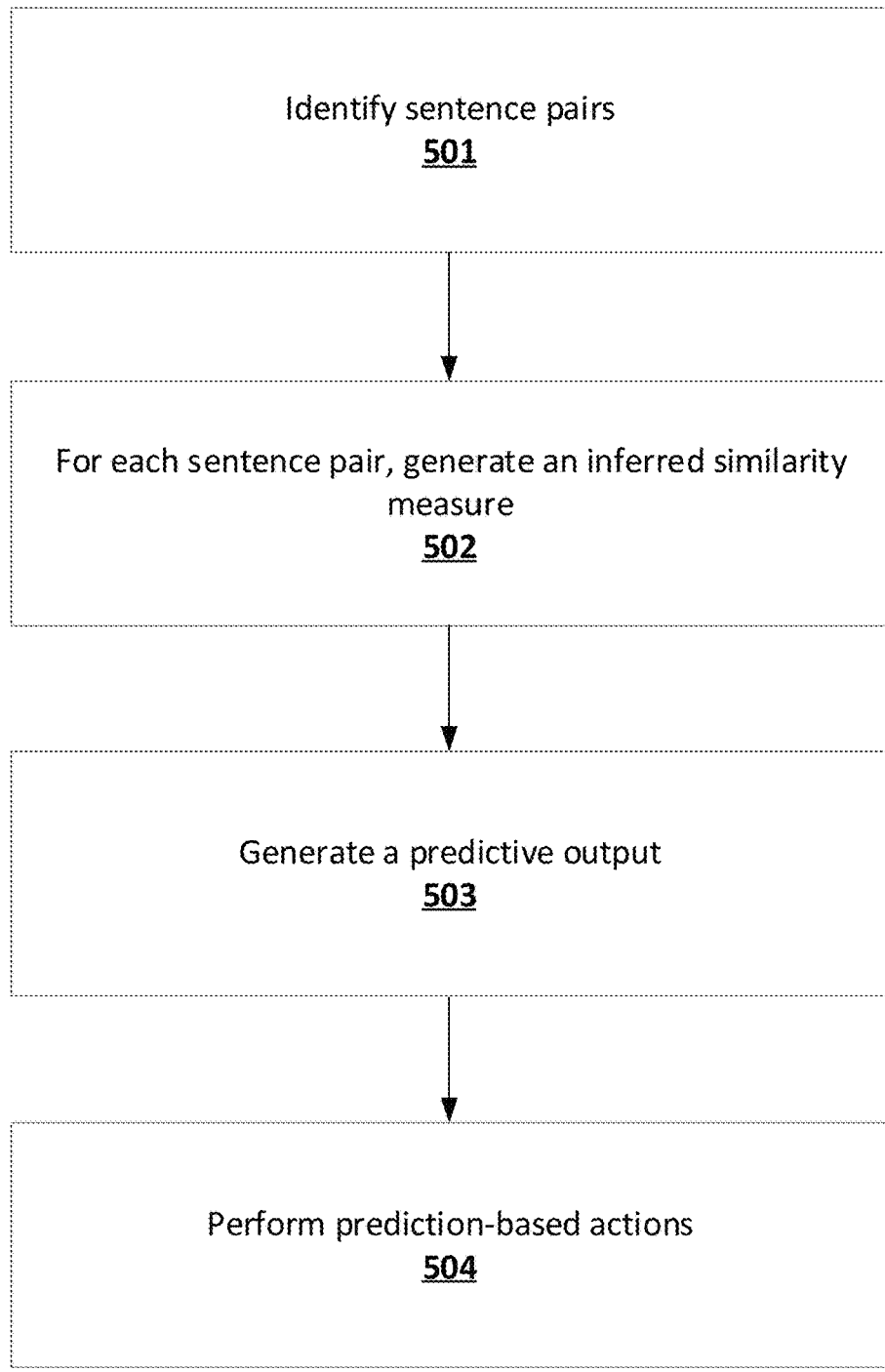

FIG. 5 is a flowchart diagram of an example process for performing one or more domain-aware predictive inferences on a first natural language document data object having one or more first sentences and a second natural language document data object having one or more second sentences in accordance with some embodiments discussed herein.

Figure 6:
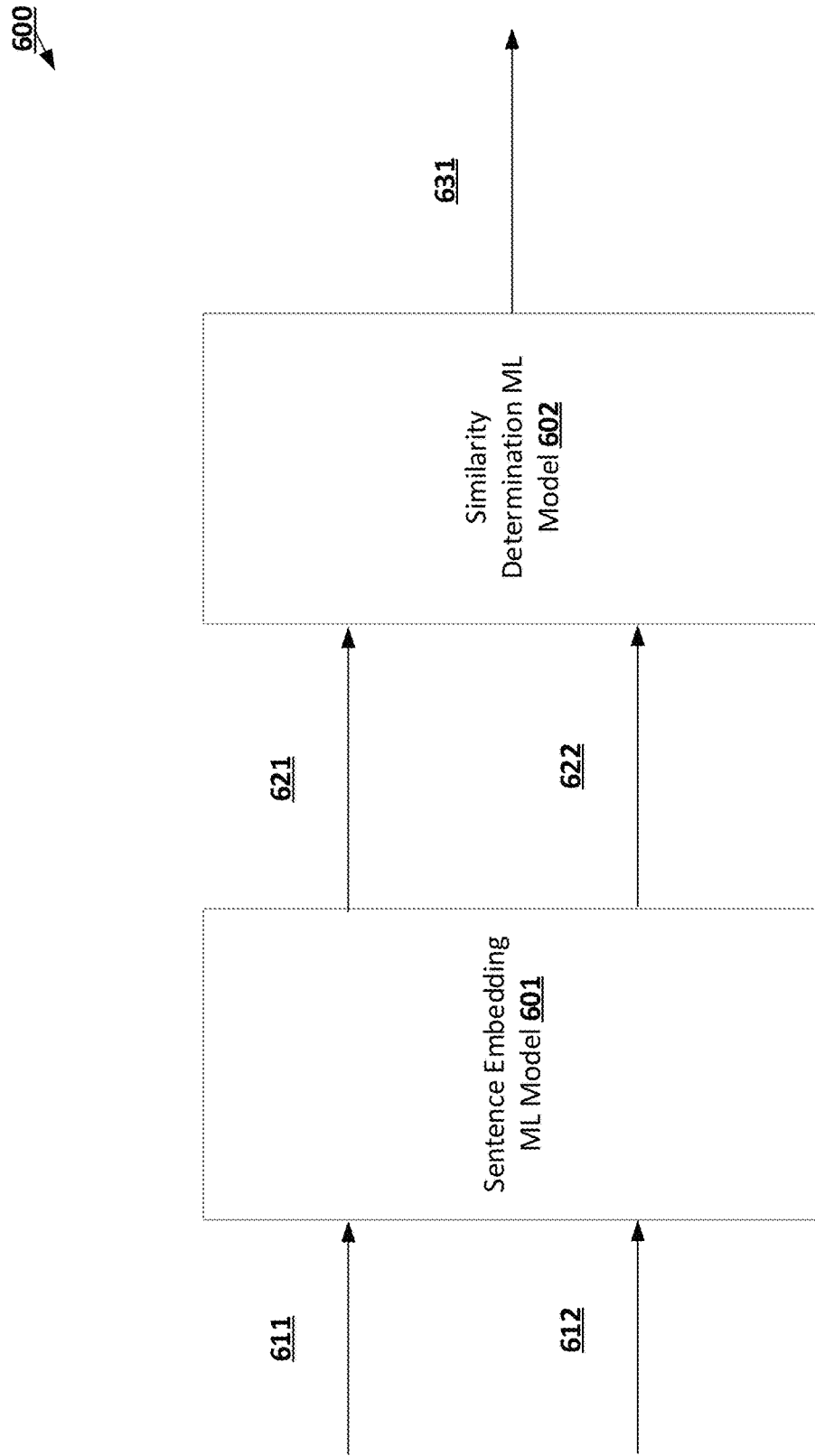

FIG. 6 provides an operational example of a cross-sentence similarity determination machine learning framework in accordance with some embodiments discussed herein.

Figure 7:
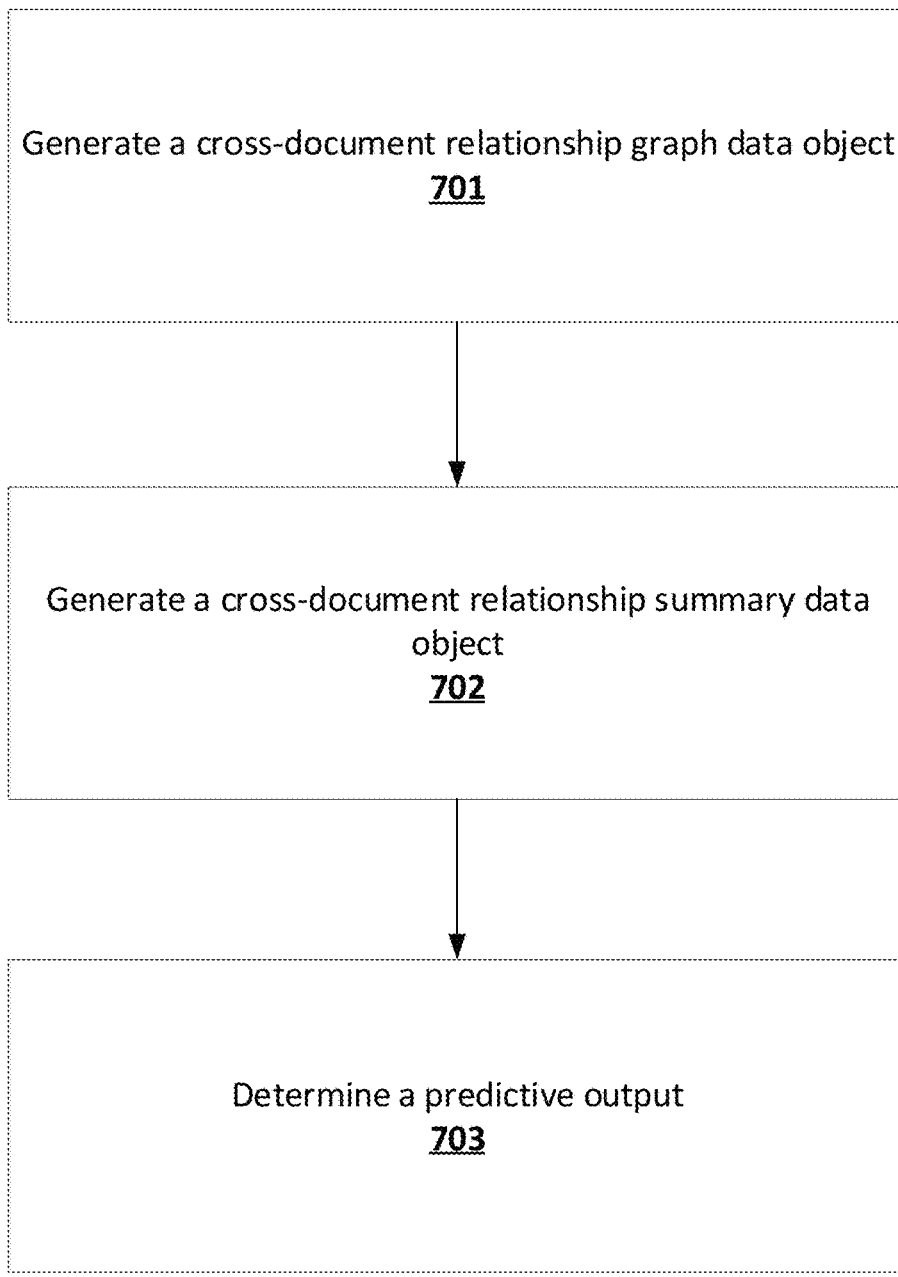

FIG. 7 is a flowchart diagram of an example process for generating a predictive output that includes a cross-document relationship summary data object for two natural language document data objects based at least in part on the cross-document relationship graph data object for the two natural language document data objects in accordance with some embodiments discussed herein.

Figure 8:
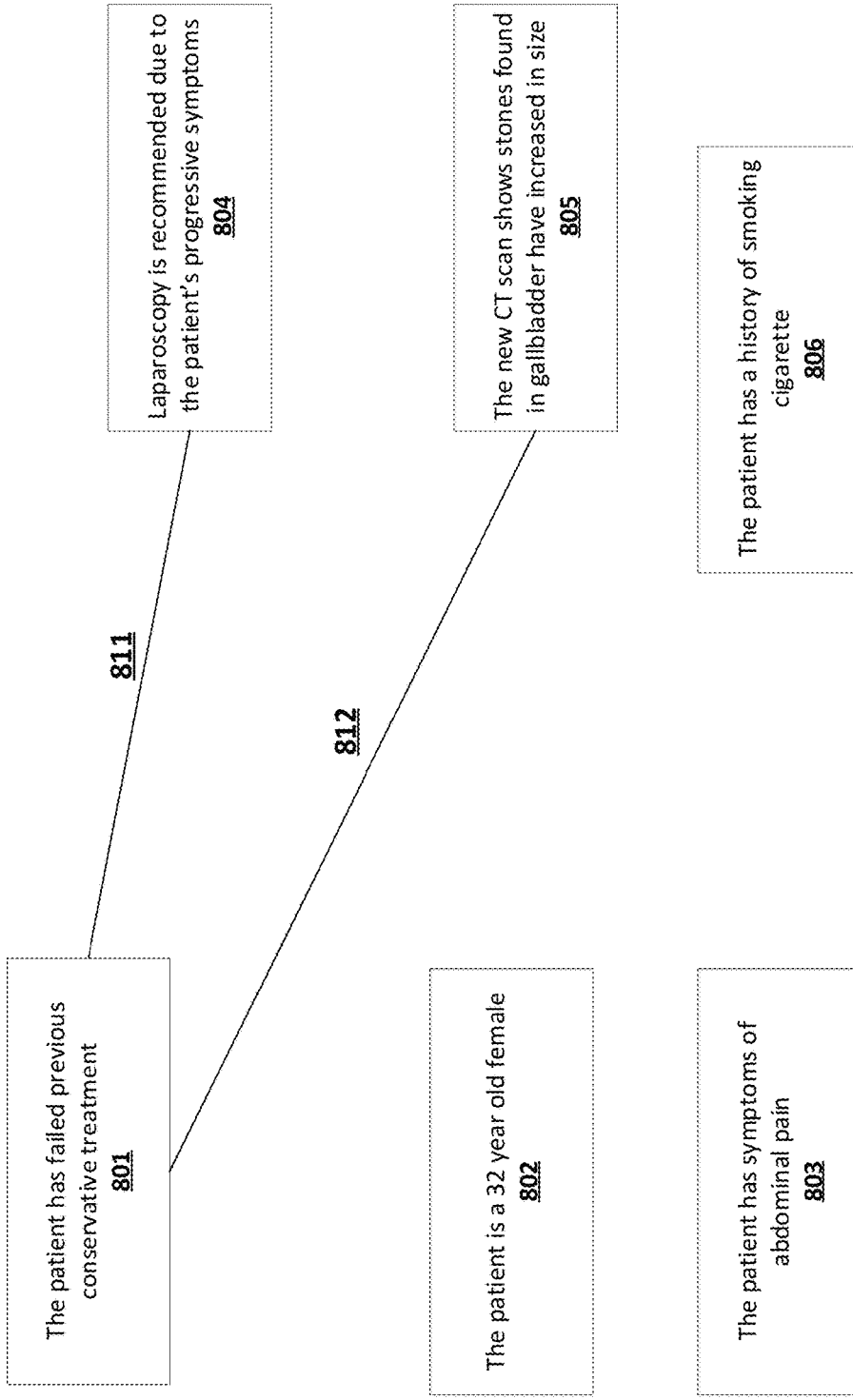

FIG. 8 provides an operational example of a cross-document relationship graph data object in accordance with some embodiments discussed herein.

Figure 9:
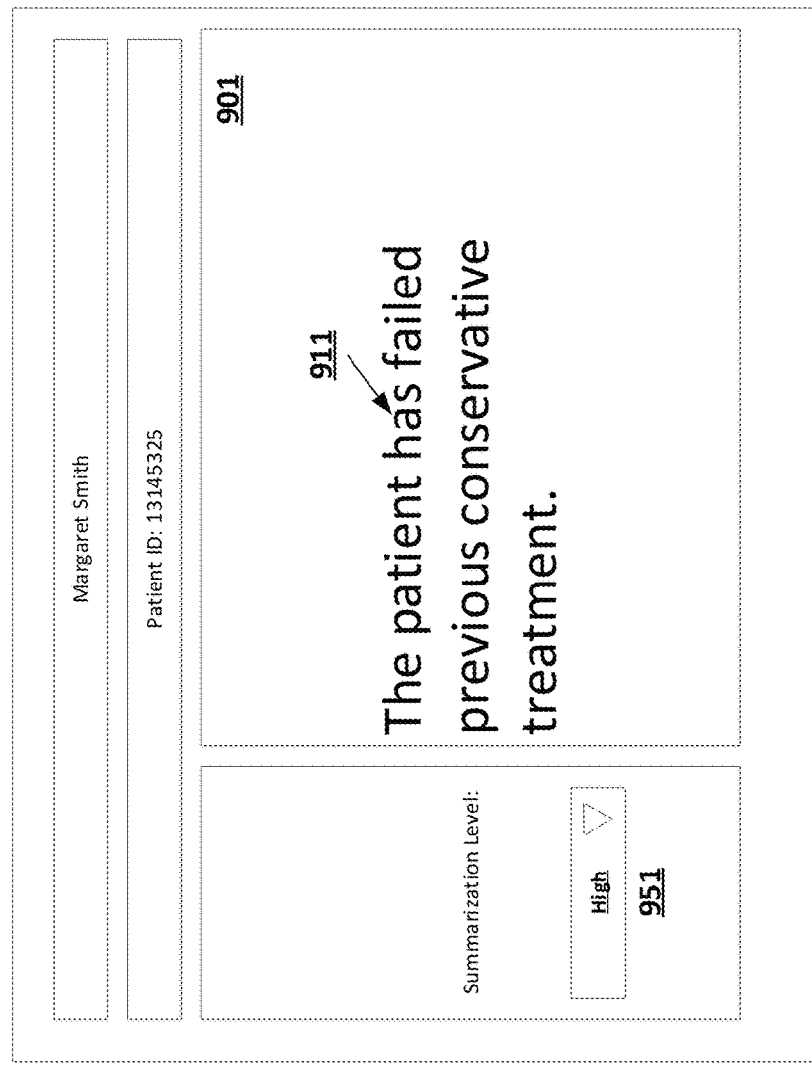

FIG. 9 provides an operational example of a prediction output user interface that is configured to describe a cross-document relationship summary data object that is generated based at least in part on a "high" user-selected summarization intensity requirement in accordance with some embodiments discussed herein.

Figure 10:
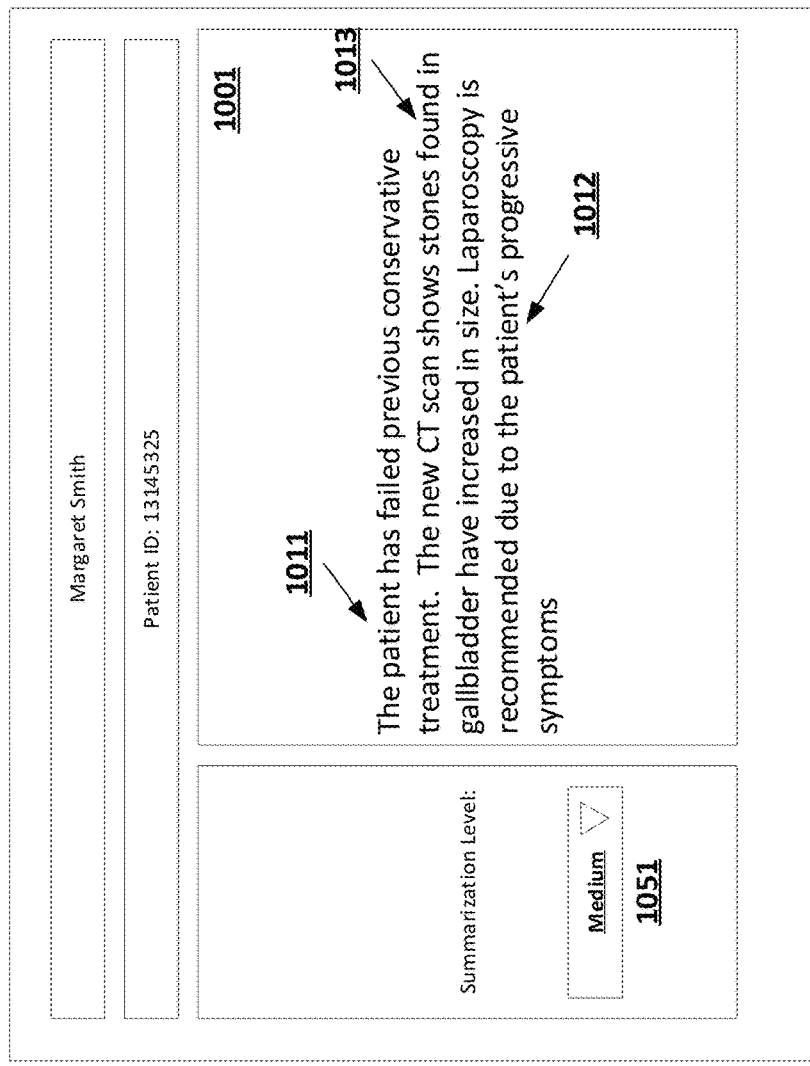

FIG. 10 provides an operational example of a prediction output user interface that is configured to describe a cross-document relationship summary data object that is generated based at least in part on a "medium" user-selected summarization intensity requirement in accordance with some embodiments discussed herein.

Figure 11:
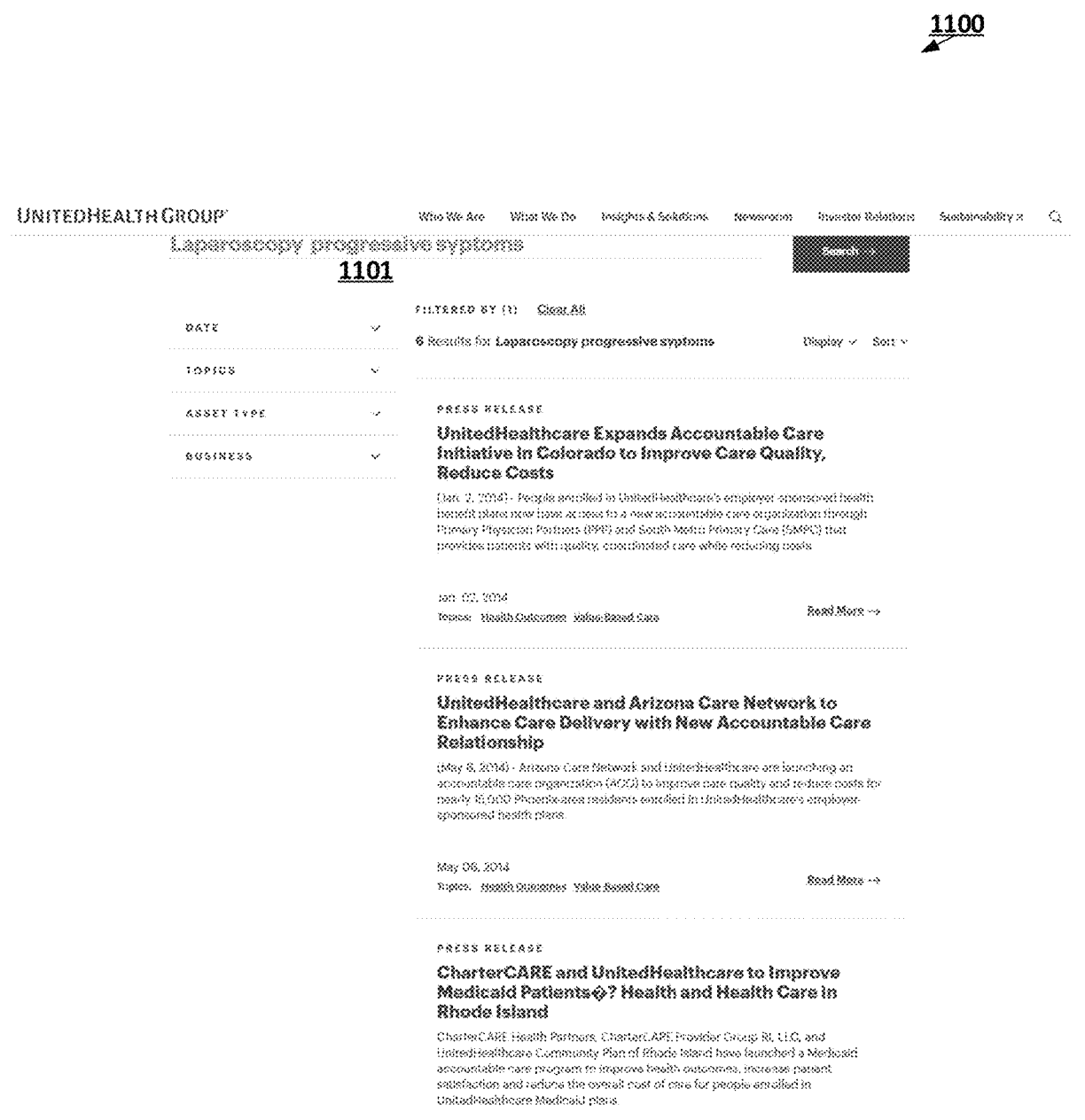

FIG. 11 provides an operational example of a prediction output user interface that is configured to describe a search result data object in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis tasks.

I. Overview and Technical Improvements

Various embodiments of the present invention improve the reliability and predictive accuracy of natural language processing solutions by introducing solutions that integrate domain-specific insights into sentence embedding machine learning models by training the noted sentence embedding machine learning models in coordination with similarity determination models. In some embodiments, one primary advantage of training a sentence embedding machine learning model by using the techniques described herein is that the resulting sentence embedding machine learning models can be configured to generate domain-aware sentence embeddings even in the absence of ground-truth data that directly describe how domain-aware sentence embeddings should be structured and what those domain-aware sentence embeddings are structured. In some embodiments, sentence embedding machine learning models can be trained to integrate domain-specific insights in a supervised manner by using ground-truth data about similarities of word groupings, and via training the generating a sentence embedding machine learning model in coordination with a similarity determination machine learning model and using a training task that requires predicting similarity measures for sentence pairs based at least in part on sentence embeddings that are generated using the sentence embedding machine learning model. In this way, various embodiments of the present invention enable training sentence embedding machine learning models to generate domain-aware sentence embeddings, which in turn enables integrating those domain-aware sentence embeddings into machine learning frameworks that are more accurate and reliable from a predictive standpoint because they integrate domain-specific insights and considerations.

In some embodiments, training sentence embedding machine learning models and similarity determination machine learning models in combination can further enhance domain-aware training of sentence embedding machine learning models by generating ground-truth training data for the similarity determination machine learning models based at least in part on relationships defined by knowledgebase graph data objects. Using knowledgebase graph data objects to determine training entries for training a sentence embedding machine learning model in coordination with a sentence similarity determination machine learning model is a powerful technique for at least two reasons: first, using this technique enables automatic generation of training data which in turn enables more rigorous training of sentence embedding machine learning models and training sentence embedding machine learning models, thus making the resulting machine learning frameworks more accurate and reliable from a predictive standpoint; second, using knowledgebase graph data objects to determine training entries enables embedding subject matter domain knowledge into training of sentence embedding machine learning models and sentence embedding machine learning models, as relationships defined by knowledgebase graph data objects often include substantial insights about domain-specific conceptual concepts and relationships. For example, a knowledgebase graph data object in the medical/healthcare domain may include at least portions of the Unified Medical Language System (UMLS), whose graph data structures embed valuable insights about relationships of various biomedical terms/standards.

While various embodiments of the present invention describe generating a predictive output based at least in part on inferred similarity measures for sentence pairs that are determined using the similarity determination machine learning models based at least in part on sentence embeddings that are generated using sentence embedding machine learning models, a person of ordinary skill in the relevant technology will recognize that, once trained in coordination with a similarity determination machine learning model, sentence embeddings generated by a trained sentence embedding machine learning model may be used to generate predictive outputs that do not use inferred similarity measures for sentence pairs. For example, in some embodiments, the sentence embeddings may be provided to a clinical decision support recommendation machine learning model that is configured to generate clinical decision support recommendations based at least in part on sentence embeddings generated by the trained sentence embedding machine learning model, a provider appointment recommendation machine learning model that is configured to generate provider appointment recommendations based at least in part on sentence embeddings generated by the trained sentence embedding machine learning model, a drug prescription recommendation machine learning model that is configured to generate drug prescription recommendations based at least in part on sentence embeddings generated by the trained sentence embedding machine learning model, and/or the like.

An exemplary application of various embodiments of the present invention relates to gathering, graphing, and summarizing information from relevant medical documents for a clinical review using present review policies and guidelines. Currently in the clinical review process, clinicians spend a majority of their time searching medical records to find relevant information before they are able to apply their knowledge to reach a decision in a particular review. Current technology design to speed up the process required very detailed coding of review policies and guidelines. It requires customized design and development for each policy and review type. This development can take weeks to months and requires collaboration between clinical and software engineering teams as well as other departments. When guidelines are updated the development process must be repeated. The current technology also doesn't take in user feedback as input in order to improve the system's accuracy.

To address the above-noted challenges, in accordance with various embodiments of the present invention, a machine learning model, trained using publicly available documents and internal data, is used to encode any given string, such as a sentence, within relevant documents, into a vector representation. The public data includes medical publications and their abstracts, and a Unified Medical Language System (UMLS) knowledge base, while the internal data is derived from medical charts used for UM reviews that include clinical subject matter expert (SME) annotations. The information encoder encodes both the criterion in the present review policies and guidelines, as well as one or more strings in the relevant medical records for the present clinical review. The one or more vectorized strings from the relevant medical records are then searched for strings that are semantically similar to each of the encoded criterion from the vectorized review policies and guidelines. Identified sentences are rendered in a graph where each sentence is represented by a node. Each node may have a shorter distance from the center of the graph if it is semantically similar, and medically related, or may have a longer distance if it is less relevant. The system then requests feedback from the user with regard to whether the identified sentences were relevant and also has the user identify any sentences that are relevant but were not identified as such. Active learning is used to label these instances and train the system to improve information extraction performance in the future. In some embodiments, using the previously-generated graph, a summary of the relevant medical documents is rendered. The system identifies the subset of nodes that are most central and representative of the documents based at least in part on the graph representation of vectorized sentences. During this process, any duplicate content from multiple documents is identified and removed in order to prevent time being wasted during the review process.

Other exemplary applications of various embodiments of the present invention include performing utilization management reviews based at least in part on natural language processing operations performed on clinical documents (e.g., medical note documents), performing coding reviews based at least in part on natural language processing operations performed on clinical documents used to infer medical/diagnosis codes, generating medical history reports for patients based at least in part on natural language processing operations (e.g., summarization operations) performed on medical history documents for patients, and/or the like. In some embodiments, domain-aware sentence embeddings generated in accordance with various embodiments of the present invention can be used as inputs for one or more machine learning models. For example, domain-aware sentence embeddings of sentences of a document may in some embodiments be aggregated/combined (e.g., summed up, concatenated, averaged, and/or the like) to generate domain-aware domain-specific document embeddings, and the generated document-aware sentence embeddings may be used as inputs to one or more trained machine learning models.

II. Definitions

As used herein, a "natural language document data object" may be any data object that includes one or more text tokens. Moreover, a "sentence" may be any word grouping that is deemed semantically significant, even if the word grouping is not deemed to be a sentence according to grammatical rules/guidelines The term "training entry" may refer to a data construct that is configured to describe a training entry sentence pair and a ground-truth similarity measure. Although various embodiments of the present invention describe generating a sentence embedding machine learning model in coordination with a sentence similarity determination machine learning model using a single training entry, a person of ordinary skill in the relevant technology will recognize that each training epoch of a sentence embedding machine learning model in coordination with a sentence similarity determination machine learning model can be performed using a batch of n training entries. Furthermore, a person of ordinary skill in the relevant technology will recognize that, when training of a sentence embedding machine learning model in coordination with a sentence similarity determination machine learning model is performed using more than one training entries, updating parameters of the two machine learning models may be performed either in accordance with a batch gradient descent algorithm or in accordance with a stochastic gradient descent algorithm.

The term "training entry sentence pair" may refer to a data construct that is configured to describe a pair of sentences that is associated with a ground-truth similarity measure, such as Boolean ground-truth similarity measure. In some embodiments, a training entry that is used for training a sentence embedding machine learning model in coordination with a sentence similarity determination machine learning model comprises a training entry sentence pair along with the ground-truth similarity measure for the training entry sentence pair. For example, a particular training entry may describe that a sentence $S_1$ and a sentence $S_2$ are deemed similar. As another example, a particular training entry may describe that a sentence $S_1$ and a sentence $S_3$ are deemed to be dissimilar. While various embodiments of the present invention describe that ground-truth similarity measures for training entry sentence pairs are Boolean values, a person of ordinary skill in the relevant technology will recognize that, in some embodiments, the range for potential ground-truth similarity measures may include n potential classifications and/or may include a continuous range.

The term "ground-truth similarity measure" may refer to a data construct that is configured to describe an observed/recorded measure of similarity for a sentence pair. In some embodiments, a ground-truth similarity measure describes a degree of similarity between the training entry sentence pair that is associated with the ground-truth similarity measure, where the degree of similarity may be a Boolean degree of similarity (e.g., such that if the degree of similarity is one, the training entry sentence pair are deemed to be similar, and if the degree of similarity is zero, the training entry sentence pair are deemed to be dissimilar). In some embodiments, a training entry sentence pair is determined based at least in part on two nodes of a knowledgebase graph data object, and the ground-truth similarity measure of the training entry sentence pair may be determined based at least in part on the relationship of the noted two nodes in accordance with the knowledgebase graph data object. For example, in some embodiments, a training entry sentence pair may be deemed to be associated with an affirmative ground-truth similarity measure (i.e., a ground-truth similarity measure describing that the training entry sentence pair are deemed similar) if the pair of nodes associated with the training entry sentence pair have an edge between them whose edge type is one of a set of acceptable edge types. As another example, in some embodiments, a training entry sentence pair may be deemed to be associated with an affirmative ground-truth similarity measure if the pair of nodes associated with the training entry sentence pair are separated by no more than n edges, where n may be a defined hyper-parameter of a corresponding sentence similarity determination machine learning model. As yet another example, in some embodiments, a training entry sentence pair may be deemed to be associated with an affirmative ground-truth similarity measure if the pair of nodes associated with the training entry sentence pair are directly connected to each other using an edge of the corresponding graph.

The term "knowledgebase graph data object" may refer to a data construct that is configured to describe a graph where each node of the graph corresponds to a word grouping (such as a phrase or a sentence, where a phrase is a non-sentence word grouping). In some embodiments, each edge of a graph corresponding to a knowledgebase graph data object describes one or more conceptual relationships between the word groupings that are associated with the edge. For example, in some embodiments, each edge of the noted graph has an edge type that is associated with a conceptual relationship type, and thus the presence of a particular edge having a particular edge type between two nodes may imply that the word groupings that are associated with the particular edge have a particular conceptual relationship that is associated with the particular edge type. As another example, in some embodiments, edges of a graph corresponding to a knowledgebase graph data object do not have edge types that clarify the types of conceptual relationships between word groupings associated with nodes of the noted graph, and thus the presence of a particular edge between two nodes may merely imply that the word groupings that are associated with the particular edge have some unspecified conceptual relationship. In some embodiments, each node of a graph corresponding to a knowledgebase graph data object describes a sentence, and determining a training entry based at least in part on the knowledgebase graph data object comprises: (i) selecting a pair of nodes of the graph, (ii) determining a training entry sentence pair for the training entry based at least in part on the sentences associated with the pair of nodes, and (iii) determining the ground-truth similarity measure associated with the training entry based at least in part on the relationship between the pair of nodes as described by the edges of the graph. In some embodiments, each node of a graph corresponding to a knowledgebase graph data object describes a phrase (i.e., a non-sentence word grouping, such as a word), and determining a training entry based at least in part on the knowledgebase graph data object comprises: (i) selecting a pair of nodes of the graph that is associated with a pair of phrases, (ii) for each phrase in the pair of phrases, extracting a sentence from a document corpus (e.g., a domain-specific document corpus, such as a medical note document corpus in the medical/healthcare domain), (iii) determining the training entry sentence pair to comprise each extracted sentence, and (iv) determining the ground-truth similarity measure associated with the training entry based at least in part on the relationship between the pair of nodes as described by the edges of the graph.

The term "sentence embedding machine learning model" may refer to a data construct that is configured to describe parameters, hyper-parameters, and/or defined operations of a machine learning model that is configured to process an input sentence (e.g., a bad of words representation of an input sentence) in order to generate a sentence embedding for the input sentence, where the sentence embedding may be a fixed-size representation of the input sentence. In some embodiments, even prior to any training operations performed in accordance with various embodiments of the present invention, the sentence embedding machine learning model is a pretrained sentence embedding machine learning model that is configured to enable retraining of the pretrained sentence embedding machine learning model. Examples of sentence embedding machine learning model includes a combination of one or more Word2Vec models, a Paragraph2Vec model, a language embedding model using an attention mechanism (e.g., a language embedding model using a multi-headed attention mechanism, such as the Bidirectional Encoders Representations from Transformers (BERT) model or the Robustly Optimized BERT Pretraining Approach (RoBERTa) model, and/or the like), and/or the like. In some embodiments, the inputs to a sentence embedding machine learning model comprises one or more vectors describing an input sentence (e.g., a bag of words representation vector for the sentence), while the outputs of the sentence embedding machine learning model comprise a vector describing the sentence embedding for the input sentence.

The term "inferred similarity measure" may refer to a data construct that is configured to describe a measure of similarity or dissimilarity for a sentence pair that is generated by a similarity determination machine learning model via processing the sentence embeddings for the sentence embedding as generated by a sentence embedding machine learning model. For example, during training of a sentence embedding machine learning model in coordination with a sentence similarity determination machine learning model, an inferred similarity measures for each training entry sentence pair of a training entry may be generated by a sentence similarity determination machine learning model and compared to a ground-truth similarity measure for the training entry in order to determine a similarity model error measure for the sentence similarity determination machine learning model. As another example, during a predictive inference performed using a trained sentence embedding machine learning model and a trained similarity determination machine learning model, the inferred similarity measure for a sentence pair comprising a first sentence from a first natural language document data object and a second sentence from a second natural language document data object may be used to generate a predictive output about one or more inferred relationships of the two noted natural language document data objects. In some embodiments, the inferred similarity measure is a value selected from a continuous range, such as from the range [0, 1], even when the corresponding ground-truth similarity measure is a value selected from a discrete range, such as from the Boolean range $\{0, 1\}$.

The term "similarity model error measure" may refer to a data construct that is configured to describe a value that is determined based at least in part on a deviation measure for the ground-truth similarity measure of at least one training entry and the inferred similarity measure of the at least one training entry. In some embodiments, a similarity determination model error measure describes at least one deviation measure between an inferred similarity measure for a training entry and the ground-truth similarity measure for the training entry. In some embodiments, during a batch gradient descent training routine given a training batch of n training entries, the similarity determination model error measure is determined based at least in part on n deviation measures, where each deviation measure is determined based at least in part on a deviation of an inferred similarity measure for a given training entry of the n training entries and the ground-truth similarity measure for the given training entry. While various embodiments of the present invention describe training the sentence embedding machine learning model and the similarity determination machine learning model by minimizing an error/loss measure that is determined based at least in part on one or more outputs of the similarity determination machine learning model for one or more training entries, a person of ordinary skill in the relevant technology will recognize that in some embodiments the similarity determination machine learning model may be trained by maximizing a reward/utility measure that is determined based at least in part on one or more outputs of the similarity determination machine learning model for one or more training entries.

The term "similarity determination machine learning model" may refer to a data construct that is configured to describe parameters, hyper-parameters, and/or defined operations of a machine learning model that is configured to process sentence embeddings for a pair of sentences in order to generate an inferred similarity measure for the pair of sentences. In some embodiments, the similarity determination machine learning model comprises one or more fully-connected neural network layers. In some embodiments, a sentence embedding machine learning model is trained in combination with a similarity determination machine learning model. However, a person of ordinary skill in the relevant technology will recognize that, once trained in coordination with a similarity determination machine learning model, sentence embeddings generated by a trained sentence embedding machine learning model may be used to generate predictive outputs that do not use inferred similarity measures for sentence pairs. For example, in some embodiments, the sentence embeddings may be provided to a clinical decision support recommendation machine learning model that is configured to generate clinical decision support recommendations based at least in part on sentence embeddings generated by the trained sentence embedding machine learning model, a provider appointment recommendation machine learning model that is configured to generate provider appointment recommendations based at least in part on sentence embeddings generated by the trained sentence embedding machine learning model, a drug prescription recommendation machine learning model that is configured to generate drug prescription recommendations based at least in part on sentence embeddings generated by the trained sentence embedding machine learning model, and/or the like. In some embodiments, inputs to a similarity determination machine learning model include two sentence embedding vectors for an input sentence pair, while outputs of a similarity determination machine learning model include an atomic value or a vector describing an inferred similarity measure for an input sentence pair.

The term "cross-document relationship graph data object" may refer to a data construct that is configured to describe a graph that is associated with sentence nodes corresponding to individual sentences of the two natural language document data objects, and sentence relationship edges between node pairs that are determined based at least in part on inferred similarity measures for sentence pairs that are associated with the node pairs. For example, given a cross-document relationship graph data object having a plurality of sentence nodes and one or more sentence relationship edges where the cross-document relationship graph data object is associated with two natural language document data objects having a plurality of sentences: (i) each sentence node may be associated with a corresponding sentence of the plurality of sentences, and (ii) two sentence nodes may be associated with a common sentence relationship edge if the inferred similarity measure for the sentence pair that is associated with the two sentence nodes satisfies an inferred similarity measure threshold. In an exemplary embodiment, if a first natural language document data object is associated with the sentences $S_1$ and $S_2$ and a second natural language document data object is associated with the sentences $S_3$ and $S_4$, if the inferred similarity measure for the $S_1$-$S_3$ sentence pair satisfies an inferred similarity measure threshold, the inferred similarity measure for the $S_2$-$S_4$ sentence pair fails to satisfy the inferred similarity measure threshold, the inferred similarity measure for the $S_1$-$S_4$ sentence pair fails to satisfy the inferred similarity measure threshold, and the inferred similarity measure for the $S_2$-$S_3$ sentence pair satisfies the inferred similarity measure threshold, then the cross-document relationship graph data object for the two natural language document data objects may include: (i) sentence nodes $N_1$, $N_2$, $N_3$, and $N_4$ that correspond to sentences $S_1$, $S_2$, $S_3$, and $S_4$ respectively, (ii) a sentence relationship edge between $S_1$ and $S_3$, and (iii) a sentence relationship edge between $S_2$ and $S_4$.

The term "cross-document relationship summary data object" may refer to a data construct that is configured to describe one or more relationships across two or more natural language document data objects. In some embodiments, the cross-document relationship summary data object for two or more natural language document data objects is generated based at least in part on graph-based inference outputs of performing one or more graph-based inferences on a cross-document relationship graph data object for the two or more natural language document data objects. In some embodiments, the cross-document relationship summary data object for two or more natural language document data objects describes association of any sentence pair associated with the two or more natural language document data objects whose inferred similarity measure satisfies an inferred similarity measure threshold. In some embodiments, the cross-document relationship summary data object for two or more natural language document data objects describes association of any sentence pair associated with the two or more natural language document data objects whose inferred similarity measure satisfies an inferred similarity measure threshold, where associations between sentence pairs having threshold-satisfying inferred similarity measures are ranked based at least in part on an ordering of the sentence pairs that is determined based at least in part on the inferred similarity measures for the noted sentence pairs. For example, in some embodiments, generating the cross-document relationship summary data object for two natural language document data objects may include: (i) for each sentence node of a corresponding cross-document relationship graph data object, determine a centrality score based at least in part on a number of sentence edges that are connected to the sentence node, (ii) generating the graph-based inference outputs based at least in part on each sentence node whose centrality score satisfies a centrality score threshold, and (iii) generating the cross-document relationship summary data object to describe each sentence node having a threshold-satisfying centrality score.

The term "search result data object" may refer to a data construct that is configured to describe one or more natural language document data object that are deemed responsive to a term described by a user-provided search query. For example, in some embodiments, given a user-provided search query and a set of n candidate natural language document data objects forming a document corpus for a search operation, a cross-document similarity measure may be determined for each candidate natural language document data object that describes an cross-document similarity measure for the candidate natural language document data object with respect to a natural language document data object that includes (e.g., solely includes, essentially includes, and/or the like) the user-provided search query, and then the search result data object may be determined based at least in part on each cross-document similarity measure for the document corpus. For example, in some embodiments, m percent of the candidate natural language document data objects whose cross-document similarity measures fall in the top m percent of the cross-document similarity measures for the document corpus may be included in the search result data object based at least in part on a descending order of cross-document similarity measures.

The term "cross-document similarity measure" may refer to a data construct that is configured to describe an inferred measure of similarity of two or more natural language document data objects. In some embodiments, the cross-document similarity measure for two natural language document objects is determined based at least in part on (e.g., by combining, such as summing or averaging) each inferred similarity measure for a sentence pair that is associated with the two natural language document objects. In some embodiments, the cross-document similarity measure for two or more natural language document objects is determined based at least in part on (e.g., by combining, such as summing or averaging) each inferred similarity measure for a sentence pair that is associated with the two or more natural language document objects. In some embodiments, the cross-document similarity measure for two or more natural language document objects is determined based at least in part on the output of a machine learning model that is configured/trained to process each inferred similarity measure for a sentence pair that is associated with the two or more natural language document objects in order to generate the cross-document similarity measure for the two or more natural language document data objects.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions.

An example of a prediction-based action that can be performed using the predictive data analysis system 101 is summarizing two or more natural language document data objects. Another example of a prediction-based action that can be performed using the predictive data analysis system 101 is returning search results in response to a user-provided search query having a user-provided search query term.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary Client Computing Entity

FIG. 3 provides an illustrative schematic representative of an client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1xRTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

Provided below are exemplary techniques for generating a cross-sentence similarity determination machine learning framework and for using a trained cross-sentence similarity determination machine learning framework to perform one or more predictive inferences. However, while various embodiments of the present invention describe the model generation operations described herein and the predictive inference operations described herein as being performed by the same single computing entity, a person of ordinary skill in the relevant technology will recognize that each of the noted sets of computer-implemented operations described herein can be performed by one or more computing entities that may be the same as or different from the one or more computing entities used to perform each of the other sets of computer-implemented operations described herein.

As described below, various embodiments of the present invention improve the reliability and predictive accuracy of natural language processing solutions by introducing solutions that integrate domain-specific insights into sentence embedding machine learning models by training the noted sentence embedding machine learning models in coordination with similarity determination models. In some embodiments, one primary advantage of training a sentence embedding machine learning model by using the techniques described herein is that the resulting sentence embedding machine learning models can be configured to generate domain-aware sentence embeddings even in the absence of ground-truth data that directly describe how domain-aware sentence embeddings should be structured and what those domain-aware sentence embeddings are structured. In some embodiments, sentence embedding machine learning models can be trained to integrate domain-specific insights in a supervised manner by using ground-truth data about similarities of word groupings, and via training the generating a sentence embedding machine learning model in coordination with a similarity determination machine learning model and using a training task that requires predicting similarity measures for sentence pairs based at least in part on sentence embeddings that are generated using the sentence embedding machine learning model. In this way, various embodiments of the present invention enable training sentence embedding machine learning models to generate domain-aware sentence embeddings, which in turn enables integrating those domain-aware sentence embeddings into machine learning frameworks that are more accurate and reliable from a predictive standpoint because they integrate domain-specific insights and considerations.

Model Generation Operations

FIG. 4 is a flowchart diagram of an example process 400 for generating a sentence embedding machine learning model in coordination with a sentence similarity determination machine learning model. Via the various steps/operations of the process 400, the predictive data analysis computing entity 106 can use ground-truth data about similarity of sentence pairs and/or similarity of phrase pairs in order to generate a sentence embedding machine learning model that is configured to generate domain-aware sentence embeddings.

The process 400 begins at step/operation 401 when the predictive data analysis computing entity 106 generates a training entry that is associated with a training entry sentence pair comprising two training entry sentences and a ground-truth similarity measure. In some embodiments, a ground-truth similarity measure describes a degree of similarity between the training entry sentence pair that is associated with the ground-truth similarity measure, where the degree of similarity may be a Boolean degree of similarity (e.g., such that if the degree of similarity is one, the training entry sentence pair are deemed to be similar, and if the degree of similarity is zero, the training entry sentence pair are deemed to be dissimilar).

Although various embodiments of the present invention describe the process 400 as being performed using a single training entry, a person of ordinary skill in the relevant technology will recognize that each training epoch of a sentence embedding machine learning model in coordination with a sentence similarity determination machine learning model can be performed using a batch of n training entries. Furthermore, a person of ordinary skill in the relevant technology will recognize that, when training of a sentence embedding machine learning model in coordination with a sentence similarity determination machine learning model is performed using more than one training entries, updating parameters of the two machine learning models may be performed either in accordance with a batch gradient descent algorithm or in accordance with a stochastic gradient descent algorithm. For example, if the process 400 is performed using n training entries, then at step/operation 401, n training entries may be generated.

A training entry sentence pair may be any pair of sentences that is associated with a ground-truth similarity measure, such as Boolean ground-truth similarity measure. In some embodiments, a training entry that is used for training a sentence embedding machine learning model in coordination with a sentence similarity determination machine learning model comprises a training entry sentence pair along with the ground-truth similarity measure for the training entry sentence pair. For example, a particular training entry may describe that a sentence $S_1$ and a sentence $S_2$ are deemed similar. As another example, a particular training entry may describe that a sentence $S_1$ and a sentence $S_3$ are deemed to be dissimilar. While various embodiments of the present invention describe that ground-truth similarity measures for training entry sentence pairs are Boolean values, a person of ordinary skill in the relevant technology will recognize that, in some embodiments, the range for potential ground-truth similarity measures may include n potential classifications and/or may include a continuous range.

In some embodiments, a training entry sentence pair is determined based at least in part on two nodes of a knowledgebase graph data object, and the ground-truth similarity measure of the training entry sentence pair may be determined based at least in part on the relationship of the noted two nodes in accordance with the knowledgebase graph data object. In some embodiments, a knowledgebase graph data object describes a graph where each node of the graph corresponds to a word grouping (such as a phrase or a sentence, where a phrase is a non-sentence word grouping). In some embodiments, each edge of a graph corresponding to a knowledgebase graph data object describes one or more conceptual relationships between the word groupings that are associated with the edge. For example, in some embodiments, each edge of the noted graph has an edge type that is associated with a conceptual relationship type, and thus the presence of a particular edge having a particular edge type between two nodes may imply that the word groupings that are associated with the particular edge have a particular conceptual relationship that is associated with the particular edge type. As another example, in some embodiments, edges of a graph corresponding to a knowledgebase graph data object do not have edge types that clarify the types of conceptual relationships between word groupings associated with nodes of the noted graph, and thus the presence of a particular edge between two nodes may merely imply that the word groupings that are associated with the particular edge have some unspecified conceptual relationship.

In some embodiments, each node of a graph corresponding to a knowledgebase graph data object describes a sentence, and determining a training entry based at least in part on the knowledgebase graph data object comprises: (i) selecting a pair of nodes of the graph, (ii) determining a training entry sentence pair for the training entry based at least in part on the sentences associated with the pair of nodes, and (iii) determining the ground-truth similarity measure associated with the training entry based at least in part on the relationship between the pair of nodes as described by the edges of the graph. In some embodiments, each node of a graph corresponding to a knowledgebase graph data object describes a phrase (i.e., a non-sentence word grouping, such as a word), and determining a training entry based at least in part on the knowledgebase graph data object comprises: (i) selecting a pair of nodes of the graph that is associated with a pair of phrases, (ii) for each phrase in the pair of phrases, extracting a sentence from a document corpus (e.g., a domain-specific document corpus, such as a medical note document corpus in the medical/healthcare domain), (iii) determining the training entry sentence pair to comprise each extracted sentence, and (iv) determining the ground-truth similarity measure associated with the training entry based at least in part on the relationship between the pair of nodes as described by the edges of the graph.

As described above, when a training entry sentence pair of a training entry are determined directly or indirectly based at least in part on a node pair from a graph corresponding to a knowledgebase graph data object, the ground-truth similarity measure for the training entry sentence pair may be determined based at least in part on the relationship between the node pair as defined by the edges of the knowledgebase graph data object. For example, in some embodiments, a training entry sentence pair may be deemed to be associated with an affirmative ground-truth similarity measure (i.e., a ground-truth similarity measure describing that the training entry sentence pair are deemed similar) if the pair of nodes associated with the training entry sentence pair have an edge between them whose edge type is one of a set of acceptable edge types. As another example, in some embodiments, a training entry sentence pair may be deemed to be associated with an affirmative ground-truth similarity measure if the pair of nodes associated with the training entry sentence pair are separated by no more than n edges, where n may be a defined hyper-parameter of a corresponding sentence similarity determination machine learning model. As yet another example, in some embodiments, a training entry sentence pair may be deemed to be associated with an affirmative ground-truth similarity measure if the pair of nodes associated with the training entry sentence pair are directly connected to each other using an edge of the corresponding graph.

Using knowledgebase graph data objects to determine training entries for training a sentence embedding machine learning model in coordination with a sentence similarity determination machine learning model is a powerful technique for at least two reasons: first, using this technique enables automatic generation of training data which in turn enables more rigorous training of sentence embedding machine learning models and training sentence embedding machine learning models, thus making the resulting machine learning frameworks more accurate and reliable from a predictive standpoint; second, using knowledgebase graph data objects to determine training entries enables embedding subject matter domain knowledge into training of sentence embedding machine learning models and sentence embedding machine learning models, as relationships defined by knowledgebase graph data objects often include substantial insights about domain-specific conceptual concepts and relationships. For example, a knowledgebase graph data object in the medical/healthcare domain may include at least portions of the Unified Medical Language System (UMLS), whose graph data structures embed valuable insights about relationships of biomedical terms/standards.

At step/operation 402, the predictive data analysis computing entity 106 generates, for each training entry sentence in the training entry sentence pair of the training entry, a training entry sentence embedding by processing the training entry sentence using an initial sentence embedding machine learning model. The initial sentence embedding machine learning model may describe a state of the sentence embedding machine learning model that precedes a current training epoch for the sentence embedding machine learning model (where the current training epoch trains the sentence embedding machine learning model in coordination with the similarity determination machine learning model). Thus, in some embodiments, during a first training epoch, the initial sentence embedding machine learning model may describe the state of the sentence embedding machine learning model characterized by default values for all trainable parameters of the sentence embedding machine learning model, while during each subsequent training epoch, the initial sentence embedding machine learning model may describe the state of the sentence embedding machine learning model characterized by updated values for trainable parameters that were updated during an immediately preceding training epoch.

In some embodiments, the sentence embedding machine learning model may be configured to process an input sentence (e.g., a bad of words representation of an input sentence) in order to generate a sentence embedding for the input sentence, where the sentence embedding may be a fixed-size representation of the input sentence. In some embodiments, even prior to any training operations performed in accordance with various embodiments of the present invention, the sentence embedding machine learning model is a pretrained sentence embedding machine learning model that is configured to enable retraining of the pretrained sentence embedding machine learning model. Examples of sentence embedding machine learning model includes a combination of one or more Word2Vec models, a Paragraph2Vec model, a language embedding model using an attention mechanism (e.g., a language embedding model using a multi-headed attention mechanism, such as the Bidirectional Encoders Representations from Transformers (BERT) model or the Robustly Optimized BERT Pretraining Approach (RoBERTa) model, and/or the like), and/or the like.

While various embodiments of the present invention describe that a sentence is embedded, a person of ordinary skill in the relevant technology will recognize that the disclosed techniques can be used to perform similarity determinations across any word groupings, including across non-sentence phrases. Thus, in some embodiments, embeddings of non-sentence phrase pairs may be generated and used to generate inferred similarity measures for the noted non-sentence phrase pairs. In some embodiments, a sentence may be any word grouping that is deemed semantically significant, even if the word grouping is not deemed to be a sentence according to grammatical rules/guidelines.

At step/operation 403, the predictive data analysis computing entity 106 generates an inferred similarity measure for the training entry by processing each training entry sentence embedding using an initial similarity determination machine learning model. Similar to the initial sentence embedding machine learning model, the initial similarity determination machine learning model may also in some embodiments describe a state of the similarity determination machine learning model that precedes a current training epoch for the similarity determination machine learning model (where the current training epoch trains a sentence embedding machine learning model in coordination with the similarity determination machine learning model). Thus, in some embodiments, during a first training epoch, the initial similarity determination machine learning model may describe the state of the similarity determination machine learning model characterized by default values for all trainable parameters of the similarity determination machine learning model, while during each subsequent training epoch, the initial similarity determination machine learning model may describe the state of the similarity determination machine learning model characterized by updated values for trainable parameters that were updated during an immediately preceding training epoch.

An inferred similarity measure may be a measure of similarity or dissimilarity for a sentence pair that is generated by a similarity determination machine learning model via processing the sentence embeddings for the sentence embedding as generated by a sentence embedding machine learning model. For example, during training of a sentence embedding machine learning model in coordination with a sentence similarity determination machine learning model, an inferred similarity measures for each training entry sentence pair of a training entry may be generated by a sentence similarity determination machine learning model and compared to a ground-truth similarity measure for the training entry in order to determine a similarity model error measure for the sentence similarity determination machine learning model. As another example, during a predictive inference performed using a trained sentence embedding machine learning model and a trained similarity determination machine learning model, the inferred similarity measure for a sentence pair comprising a first sentence from a first natural language document data object and a second sentence from a second natural language document data object may be used to generate a predictive output about one or more inferred relationships of the two noted natural language document data objects. In some embodiments, the inferred similarity measure is a value selected from a continuous range, such as from the range [0, 1], even when the corresponding ground-truth similarity measure is a value selected from a discrete range, such as from the Boolean range {0, 1}.

At step/operation 404, the predictive data analysis computing entity 106 determines a similarity model error measure for the similarity determination machine learning model based at least in part on a deviation measure for the ground-truth similarity measure of the training entry and the inferred similarity measure of the training entry. In some embodiments, a similarity determination model error measure describes at least one deviation measure between an inferred similarity measure for a training entry and the ground-truth similarity measure for the training entry. In some embodiments, during a batch gradient descent training routine given a training batch of n training entries, the similarity determination model error measure is determined based at least in part on n deviation measures, where each deviation measure is determined based at least in part on a deviation of an inferred similarity measure for a given training entry of the n training entries and the ground-truth similarity measure for the given training entry. While various embodiments of the present invention describe training the sentence embedding machine learning model and the similarity determination machine learning model by minimizing an error/loss measure that is determined based at least in part on one or more outputs of the similarity determination machine learning model for one or more training entries, a person of ordinary skill in the relevant technology will recognize that in some embodiments the similarity determination machine learning model may be trained by maximizing a reward/utility measure that is determined based at least in part on one or more outputs of the similarity determination machine learning model for one or more training entries.

At step/operation 405, the predictive data analysis computing entity 106 updates one or more trainable parameters of the sentence embedding machine learning model and the similarity determination machine learning model in a manner that is configured to minimize the similarity determination model error measure. As described above, in some embodiments, step/operation 405 may include updating one or more trainable parameters of the sentence embedding machine learning model and the similarity determination machine learning model in a manner that is configured to maximizing a reward/utility measure that is determined based at least in part on one or more outputs of the similarity determination machine learning model for one or more training entries. In general, step/operation 405 may include optimizing the value of a performance evaluation measure for the similarity determination machine learning model, where the noted optimization may be performed by a global optimization technique and/or a local optimization technique, such as by using a gradient descent algorithm.

In some embodiments, one primary advantage of training a sentence embedding machine learning model by using the techniques described herein in relation to the process 400 is that the resulting sentence embedding machine learning models can be configured to generate domain-aware sentence embeddings even in the absence of ground-truth data that directly describe how domain-aware sentence embeddings should be structured and what those domain-aware sentence embeddings are structured. In some embodiments, sentence embedding machine learning models can be trained to integrate domain-specific insights in a supervised manner by using ground-truth data about similarities of word groupings, and via training the generating a sentence embedding machine learning model in coordination with a similarity determination machine learning model and using a training task that requires predicting similarity measures for sentence pairs based at least in part on sentence embeddings that are generated using the sentence embedding machine learning model. In this way, various embodiments of the present invention enable training sentence embedding machine learning models to generate domain-aware sentence embeddings, which in turn enables integrating those domain-aware sentence embeddings into machine learning frameworks that are more accurate and reliable from a predictive standpoint because they integrate domain-specific insights and considerations.

Predictive Inference Operations

Once trained, the sentence embedding machine learning model and the sentence similarity machine learning model can be used to generate domain-aware similarity measures for sentence pairs and perform prediction-based actions based at least in part on the domain-aware similarity measures. FIG. 5 is a flowchart diagram of an example process 500 for performing one or more domain-aware predictive inferences on a first natural language document data object having one or more first sentences and a second natural language document data object having one or more second sentences. As used herein, a natural language document data object may be any data object that includes one or more text tokens. Moreover, a sentence may be any word grouping that is deemed semantically significant, even if the word grouping is not deemed to be a sentence according to grammatical rules/guidelines. As used herein, the term "domain-aware similarity measure" may include one or both of: (i) an inferred prediction about the likelihood that two sentences in a corresponding sentence pair are similar to each other, and (ii) an inferred prediction about the likelihood that two sentences in a corresponding sentence pair are related to each other. Accordingly, a domain-aware similarity measure for a sentence pair may in some embodiments be equivalent to or be determined based at least in part on the domain-aware relatedness measure for the sentence pair.

The process 500 begins at step/operation 501 when the predictive data analysis computing entity 106 identifies one or more sentence pairs, where each sentence pair includes a first sentence from the first natural language document data object and a second sentence from the second natural language document data object. In some embodiments, given a sentences in the first natural language document data object and b sentences in the second natural language document data object, a*b sentence pairs are selected, i.e., each potential sentence pair is selected. In some embodiments, given a sentences in the first natural language document data object and b sentences in the second natural language document data object, a floor or ceiling of (a*b)/r sentence pairs are selected (e.g., are randomly selected), where r may be a hyper-parameter of the predictive data analysis system 101. In some embodiments, given a sentences in the first natural language document data object and b sentences in the second natural language document data object, a floor or ceiling of $c=a/r_1$ are selected (e.g., are randomly selected) from the first natural language document data object, a floor or ceiling of $d=b/r_1$ are selected (e.g., are randomly selected) from the second natural language document data object, and c*d sentence pairs are selected, where $r_1$ and $r_2$ may be hyper-parameters of the predictive data analysis system 101. In some embodiments, given a sentences in the first natural language document data object and b sentences in the second natural language document data object, a floor or ceiling of $c=a/r_1$ are selected (e.g., are randomly selected) from the first natural language document data object, a floor or ceiling of $d=b/r_1$ are selected (e.g., are randomly selected) from the second natural language document data object, and $(c*d)/r_3$ sentence pairs are selected, where $r_1$, $r_2$, and $r_3$ may be hyper-parameters of the predictive data analysis system 101.

At step/operation 502, the predictive data analysis computing entity 106 generates an inferred similarity measure for each selected sentence pair. In some embodiments, performing the step/operation 502 includes: (i) for each sentence pair, generating a sentence embedding for each sentence of the sentence embedding using a trained sentence embedding machine learning model, and (ii) processing the two sentence embedding for the two sentences of the sentence pair using a trained similarity determination machine learning model to generate the inferred similarity measure for the sentence pair.

Thus, determining the inferred similarity measure for a sentence pair may comprise utilizing a cross-sentence similarity determination machine learning framework 600 that has the architecture that is depicted in FIG. 6. As depicted in FIG. 6, the cross-sentence similarity determination machine learning framework 600 includes: (i) a sentence embedding machine learning model 601, and (ii) a similarity determination machine learning model 602. The sentence embedding machine learning model 601 is configured to process a sentence pair comprising the sentence 611 and the sentence 612 to generate the sentence embedding 621 for the sentence 611 and the sentence embedding 622 for the sentence 612, while the similarity determination machine learning model 602 is configured to process the sentence embedding 621 and the sentence embedding 622 in order to generate the inferred similarity measure 631 for the sentence pair. In some embodiments, the similarity determination machine learning model 602 comprises one or more fully-connected neural network layers.

At step/operation 503, the predictive data analysis computing entity 106 generates a predictive output based at least in part on each inferred similarity measure for a sentence pair. In some embodiments, a predictive output describes one or more inferred insights about a relationship of a first natural language document data object and a second natural language document data object that is determined based at least in part on the one inferred similarity measure for at least one sentence pair that includes a first sentence from the first natural language document data object and a second sentence from the second natural language document data object. Examples of predictive outputs for a first natural language document data object and a second natural language document data object include a cross-document relationship graph data object for the two natural language document data objects, a cross-document relationship summary data object for the two natural language document data objects, a search result data object that is determined based at least in part on a set of natural language document data objects that includes the two natural language document data objects, and/or the like.

For example, in some embodiments, the inferred similarity measures for one or more sentence pairs associated with two natural language document data objects may be used to determine a cross-document relationship graph data object, where the cross-document relationship graph data object may describe a graph that is associated with sentence nodes corresponding to individual sentences of the two natural language document data objects, and sentence relationship edges between node pairs that are determined based at least in part on inferred similarity measures for sentence pairs that are associated with the node pairs. For example, given a cross-document relationship graph data object having a plurality of sentence nodes and one or more sentence relationship edges where the cross-document relationship graph data object is associated with two natural language document data objects having a plurality of sentences: (i) each sentence node may be associated with a corresponding sentence of the plurality of sentences, and (ii) two sentence nodes may be associated with a common sentence relationship edge if the inferred similarity measure for the sentence pair that is associated with the two sentence nodes satisfies an inferred similarity measure threshold.

In an exemplary embodiment, if a first natural language document data object is associated with the sentences $S_1$ and $S_2$ and a second natural language document data object is associated with the sentences $S_3$ and $S_4$, if the inferred similarity measure for the $S_1$-$S_3$ sentence pair satisfies an inferred similarity measure threshold, the inferred similarity measure for the $S_2$-$S_4$ sentence pair fails to satisfy the inferred similarity measure threshold, the inferred similarity measure for the $S_1$-$S_4$ sentence pair fails to satisfy the inferred similarity measure threshold, and the inferred similarity measure for the $S_2$-$S_3$ sentence pair satisfies the inferred similarity measure threshold, then the cross-document relationship graph data object for the two natural language document data objects may include: (i) sentence nodes $N_1$, $N_2$, $N_3$, and $N_4$ that correspond to sentences $S_1$, $S_2$, $S_3$, and $S_4$ respectively, (ii) a sentence relationship edge between $S_1$ and $S_3$, and (iii) a sentence relationship edge between $S_2$ and $S_4$.

Although various embodiments of the present invention describe generating cross-document relationship graph data objects for pairs of natural language document data objects, a person of ordinary skill in the relevant technology will recognize that cross-document relationship graph data objects can be generated for any n-groupings of natural language document data objects, where n may be a value of one or more. For example, given n=1, the cross-document relationship graph data object may describe internal relationships between sentence pairs that are both selected from the sentences of a single natural language document. As another example, given n=3, the cross-document relationship graph data object may describe internal relationships between sentence pairs each comprising a sentence that is selected from one of a triplet of natural language documents. Moreover, even when n>=2, the sentence pairs that comprise sentences from different natural language documents may be only a subset of the sentence pairs whose inferred similarity measures are mapped to sentence relationship edges of a cross-document relationship graph data object. For example, even when n=2, the cross-document relationship graph data object for a given pair of natural language document data objects may include a sentence relationship edge between a node pair corresponding to a sentence pair that is selected from a single natural language document data object if the inferred similarity measure for the sentence pair satisfies an inferred similarity measure threshold.

In some embodiments, the predictive output that is generated at step/operation 503 includes a cross-document relationship summary data object that describes one or more relationships across two or more natural language document data objects. In some embodiments, the cross-document relationship summary data object for two or more natural language document data objects is generated based at least in part on graph-based inference outputs of performing one or more graph-based inferences on a cross-document relationship graph data object for the two or more natural language document data objects. In some embodiments, the cross-document relationship summary data object for two or more natural language document data objects describes association of any sentence pair associated with the two or more natural language document data objects whose inferred similarity measure satisfies an inferred similarity measure threshold. In some embodiments, the cross-document relationship summary data object for two or more natural language document data objects describes association of any sentence pair associated with the two or more natural language document data objects whose inferred similarity measure satisfies an inferred similarity measure threshold, where associations between sentence pairs having threshold-satisfying inferred similarity measures are ranked based at least in part on an ordering of the sentence pairs that is determined based at least in part on the inferred similarity measures for the noted sentence pairs.

As described above, in some embodiments, a cross-document relationship graph data object for two or more natural language document data objects can be used to generate a cross-document relationship summary data object for the two or more natural language document data objects. FIG. 7 is a flowchart diagram of generating a predictive output that includes a cross-document relationship summary data object for two natural language document data objects based at least in part on the cross-document relationship graph data object for the two natural language document data objects. However, while various embodiments of the process that is depicted in FIG. 7 are described with reference to generating a cross-document relationship summary data object for two natural language document data objects based at least in part on the cross-document relationship graph data object for the two natural language document data objects, a person of ordinary skill in the relevant technology will recognize that the disclosed techniques of the process that is depicted in FIG. 7 can be used to generate cross-document relationship summary data object for three or more natural language document data objects based at least in part on the cross-document relationship graph data object for the three or more natural language document data objects.

The process that is depicted in FIG. 7 begins at step/operation 701 when the predictive data analysis computing entity 106 generates the cross-document relationship graph data object for the two natural language document data objects. An operational example of a cross-document relationship graph data object 800 is depicted in FIG. 8. As depicted in FIG. 8, the cross-document relationship graph data object 800 includes the sentence nodes 801-806, where there is a sentence edge 811 between the sentence node 801 and the sentence node 804, and where there is the sentence edge 812 between the sentence node 801 and the sentence node 805.

At step/operation 702, the predictive data analysis computing entity 106 generates a cross-document relationship summary data object for the two natural language document data objects based at least in part on graph-based inference outputs of performing one or more graph-based inferences on the cross-document relationship graph data object. In some embodiments, the one or more graph-based inferences comprise a centrality-based page-rank inference that is configured to generate a centrality-based page-rank score for each sentence node; and the graph-based inference outputs comprise each centrality-based page-rank score. In some embodiments, the graph-based inference outputs comprise a centrality score for each sentence node.

For example, in some embodiments, generating the cross-document relationship summary data object for two natural language document data objects may include: (i) for each sentence node of a corresponding cross-document relationship graph data object, determine a centrality score based at least in part on a number of sentence edges that are connected to the sentence node, (ii) generating the graph-based inference outputs based at least in part on each sentence node whose centrality score satisfies a centrality score threshold, and (iii) generating the cross-document relationship summary data object to describe each sentence node having a threshold-satisfying centrality score.

In some embodiments, the centrality score threshold described above may define a user-selected summarization intensity requirement for the cross-document relationship summary data object. For example, in some embodiments, given a "high" user-selected summarization intensity requirement, the resulting cross-document relationship summary data object may only include those sentences that have a centrality score that is among the top n percent of centrality scores for all of the sentence nodes of corresponding cross-document relationship graph data object. As another example, given the cross-document relationship graph data object 800 of FIG. 8, given a "high" user-selected summarization intensity requirement, the cross-document relationship summary data object may be determined based at least in part on the sentence corresponding to the sentence node 801 alone, while given a "medium" user-selected summarization intensity requirement, the cross-document relationship summary data object may be determined based at least in part on the sentence node 801, the sentence node 804, and the sentence node 805.

At step/operation 703, the predictive data analysis computing entity 106 generates a predictive output based at least in part on the cross-document relationship summary data object. In some embodiments, the predictive data analysis computing entity 106 describes both the cross-document relationship summary data object that is generated at step/operation 702 and the cross-document relationship graph data object that is generated at step/operation 701. In some embodiments, the predictive data analysis computing entity 106 describes a selected one of the cross-document relationship summary data object that is generated at step/operation 702 and the cross-document relationship graph data object that is generated at step/operation 701.

Returning to FIG. 6, another example of a predictive output is a search result data object that is determined for a user-provided search query that is in the first natural language document data object. For example, in some embodiments, given a user-provided search query and a set of n candidate natural language document data objects forming a document corpus for a search operation, a cross-document similarity measure may be determined for each candidate natural language document data object that describes an cross-document similarity measure for the candidate natural language document data object with respect to a natural language document data object that includes (e.g., solely includes, essentially includes, and/or the like) the user-provided search query, and then the search result data object may be determined based at least in part on each cross-document similarity measure for the document corpus. For example, in some embodiments, m percent of the candidate natural language document data objects whose cross-document similarity measures fall in the top m percent of the cross-document similarity measures for the document corpus may be included in the search result data object based at least in part on a descending order of cross-document similarity measures.

In some embodiments, the cross-document similarity measure of a natural language document data object may describe an inferred measure of similarity for the natural language document data object with respect to another natural language document (e.g., another natural language document data object that includes a user-provides search query). In some embodiments, the cross-document similarity measure for two natural language document objects is determined based at least in part on (e.g., by combining, such as summing or averaging) each inferred similarity measure for a sentence pair that is associated with the two natural language document objects. In some embodiments, the cross-document similarity measure for two or more natural language document objects is determined based at least in part on (e.g., by combining, such as summing or averaging) each inferred similarity measure for a sentence pair that is associated with the two or more natural language document objects.

While various embodiments of the present invention describe generating a predictive output based at least in part on inferred similarity measures for sentence pairs that are determined using the similarity determination machine learning models based at least in part on sentence embeddings that are generated using sentence embedding machine learning models, a person of ordinary skill in the relevant technology will recognize that, once trained in coordination with a similarity determination machine learning model, sentence embeddings generated by a trained sentence embedding machine learning model may be used to generate predictive outputs that do not use inferred similarity measures for sentence pairs. For example, in some embodiments, the sentence embeddings may be provided to a clinical decision support recommendation machine learning model that is configured to generate clinical decision support recommendations based at least in part on sentence embeddings generated by the trained sentence embedding machine learning model, a provider appointment recommendation machine learning model that is configured to generate provider appointment recommendations based at least in part on sentence embeddings generated by the trained sentence embedding machine learning model, a drug prescription recommendation machine learning model that is configured to generate drug prescription recommendations based at least in part on sentence embeddings generated by the trained sentence embedding machine learning model, and/or the like.

At step/operation 504, the predictive data analysis computing entity 106 performs one or more prediction-based actions based at least in part on the predictive output. In some embodiments, the predictive data analysis computing entity 106 uses the predictive output to generate one or more clinical decision support recommendations and provide the clinical decision support recommendations to one or more medical providers. In some embodiments, the predictive data analysis computing entity 106 uses the predictive output to generate one or more provider appointment recommendations for a patient entity, and automatically schedules one or more provider appointments corresponding to the one or more provider appointment recommendations. In some embodiments, the predictive data analysis computing entity 106 uses the predictive output to generate one or more drug prescription recommendations for a patient entity, and automatically schedules one or more drug filling operations corresponding to the one or more drug prescription recommendations.

In some embodiments, performing the prediction-based actions comprises generating user interface data for a prediction output user interface that is configured to display the predictive output. For example, the prediction output user interface 900 of FIG. 9 displays the cross-document relationship summary data object 901 that is determined using the cross-document relationship graph data object 800 of FIG. 8 and based at least in part on a "high" user-selected summarization intensity requirement 951, and thus only includes the sentence 911 that corresponds to sentence node 801. As another example, the prediction output user interface 1000 of FIG. 10 displays the cross-document relationship summary data object 1001 that is determined using the cross-document relationship graph data object 800 of FIG. 8 and based at least in part on a "medium" user-selected summarization intensity requirement 1051, and thus includes the sentence 1011 that corresponds to sentence node 801, the sentence 1012 that corresponds to sentence node 804, and the sentence 1013 that corresponds to sentence node 805.

In some embodiments, performing the prediction-based actions comprises generating user interface data for a prediction output user interface that is configured to describe a predictive output comprising a search result data object. For example, the prediction output user interface 1100 includes an ordered sequence of natural language document data objects, wherein the ordering of the natural language document data objects is determined based at least in part on cross-document similarity measures for the resulting natural language document data objects with respect to the user-provided user query 1101.

Accordingly, as described above, various embodiments of the present invention improve the reliability and predictive accuracy of natural language processing solutions by introducing solutions that integrate domain-specific insights into sentence embedding machine learning models by training the noted sentence embedding machine learning models in coordination with similarity determination models. In some embodiments, one primary advantage of training a sentence embedding machine learning model by using the techniques described herein is that the resulting sentence embedding machine learning models can be configured to generate domain-aware sentence embeddings even in the absence of ground-truth data that directly describe how domain-aware sentence embeddings should be structured and what those domain-aware sentence embeddings are structured. In some embodiments, sentence embedding machine learning models can be trained to integrate domain-specific insights in a supervised manner by using ground-truth data about similarities of word groupings, and via training the generating a sentence embedding machine learning model in coordination with a similarity determination machine learning model and using a training task that requires predicting similarity measures for sentence pairs based at least in part on sentence embeddings that are generated using the sentence embedding machine learning model. In this way, various embodiments of the present invention enable training sentence embedding machine learning models to generate domain-aware sentence embeddings, which in turn enables integrating those domain-aware sentence embeddings into machine learning frameworks that are more accurate and reliable from a predictive standpoint because they integrate domain-specific insights and considerations.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
generating, by one or more processors and using a sentence embedding machine learning model, a plurality of sentence embeddings based at least in part on a plurality of sentences, wherein:
  (i) the plurality of sentences comprises one or more first sentences of a first natural language document data object and one or more second sentences of a second natural language document data object, and
  (ii) the sentence embedding machine learning model is generated by updating parameters of an initial sentence embedding machine learning model based at least in part on a similarity determination model error measure that is determined based at least in part on one or more similarity determination model outputs of a sentence similarity determination machine learning model;
determining, by the one or more processors and using the sentence similarity determination machine learning model, an inferred similarity measure for a sentence pair comprising a first sentence of the one or more first sentences and a second sentence of the one or more second sentences based at least in part on a first sentence embedding of the plurality of sentence embeddings that corresponds to the first sentence and a second sentence embedding of the plurality of sentence embeddings that corresponds to the second sentence;
generating, by the one or more processors, a predictive output based at least in part on the inferred similarity measure; and
initiating, by the one or more processors, a performance of one or more prediction-based actions based at least in part on the predictive output.

2. The computer-implemented method of claim 1, wherein the initial sentence embedding machine learning model is a pretrained sentence embedding machine learning model that is configured to enable retraining the pretrained sentence embedding machine learning model.

3. The computer-implemented method of claim 1, wherein generating the predictive output comprises:

generating a cross-document relationship graph data object having a plurality of sentence nodes and one or more sentence relationship edges, wherein: (i) each sentence node is associated with a corresponding sentence of the plurality of sentences, and (ii) two sentence nodes are associated with a common sentence relationship edge if a corresponding inferred similarity measure for a corresponding sentence pair that is associated with the two sentence nodes satisfies an inferred similarity measure threshold;

generating a cross-document relationship summary data object based at least in part on one or more graph-based inference outputs of performing one or more graph-based inferences on the cross-document relationship graph data object; and generating the predictive output based at least in part on the cross-document relationship summary data object.

4. The computer-implemented method of claim 3, wherein:

the one or more graph-based inferences comprise a centrality-based page-rank inference that is configured to generate a centrality-based page-rank score for each sentence node; and the one or more graph-based inference outputs comprise each centrality-based page-rank score.

5. The computer-implemented method of claim 3, wherein the one or more graph-based inference outputs comprise a centrality score for each sentence node.

6. The computer-implemented method of claim 1, wherein:

the sentence similarity determination machine learning model is determined based at least in part on the similarity determination model error measure, the similarity determination model error measure is determined based at least in part on a deviation measure of an inferred similarity measure for a training sentence entry pair and a ground-truth similarity measure for the training sentence entry pair, and the ground-truth similarity measure is determined using a knowledge base graph data object.

7. The computer-implemented method of claim 1, wherein:

the first natural language document data object is determined based at least in part on a user-provided search query; and the predictive output describes a search result data object for the user-provided search query.

8. The computer-implemented method of claim 7, wherein:

the second natural language document data object is selected from a plurality of candidate natural language document data objects, each candidate natural language document data object is associated with a corresponding cross-document similarity measure with respect to the first natural language document data object, and the predictive output describes a ranking of at least a subset of the plurality of candidate natural language document data objects based at least in part on each corresponding cross-document similarity measure.

9. The computer-implemented method of claim 1, wherein the one or more similarity determination model outputs are generated by the sentence similarity determination machine learning model based at least in part on a training pair of sentence embeddings and a domain-specific training task.

10. A computing system comprising one or more processors and memory including program code, the memory and the program code configured to, with the one or more processors, cause the computing system to at least:

generate, using a sentence embedding machine learning model, a plurality of sentence embeddings based at least in part on a plurality of sentences, wherein:

(i) the plurality of sentences comprises one or more first sentences of a first natural language document data object and one or more second sentences of a second natural language document data object, and (ii) the sentence embedding machine learning model is generated by updating parameters of an initial sentence embedding machine learning model based at least in part on a similarity determination model error measure that is determined based at least in part on one or more similarity determination model outputs of a sentence similarity determination machine learning model;

determine, using the sentence similarity determination machine learning model, an inferred similarity measure for a sentence pair comprising a first sentence of the one or more first sentences and a second sentence of the one or more second sentences based at least in part on a first sentence embedding of the plurality of sentence embeddings that corresponds to the first sentence and a second sentence embedding of the plurality of sentence embeddings that corresponds to the second sentence;

generate a predictive output based at least in part on the inferred similarity measure; and initiate a performance of one or more prediction-based actions based at least in part on the predictive output.

11. The computing system of claim 10, wherein the initial sentence embedding machine learning model is a pretrained sentence embedding machine learning model that is configured to enable retraining the pretrained sentence embedding machine learning model.

12. The computing system of claim 10, wherein generating the predictive output comprises:

generating a cross-document relationship graph data object having a plurality of sentence nodes and one or more sentence relationship edges, wherein: (i) each sentence node is associated with a corresponding sentence of the plurality of sentences, and (ii) two sentence nodes are associated with a common sentence relationship edge if a corresponding inferred similarity measure for a corresponding sentence pair that is associated with the two sentence nodes satisfies an inferred similarity measure threshold;

generating a cross-document relationship summary data object based at least in part on one or more graph-based inference outputs of performing one or more graph-based inferences on the cross-document relationship graph data object; and generating the predictive output based at least in part on the cross-document relationship summary data object.

13. The computing system of claim 12, wherein:

the one or more graph-based inferences comprise a centrality-based page-rank inference that is configured to generate a centrality-based page-rank score for each sentence node; and the one or more graph-based inference outputs comprise each centrality-based page-rank score.

14. The computing system of claim 12, wherein the one or more graph-based inference outputs comprise a centrality score for each sentence node.

15. The computing system of claim 10, wherein:
the first natural language document data object is determined based at least in part on a user-provided search query; and
the predictive output describes a search result data object for the user-provided search query.

16. The computing system of claim 15, wherein:
the second natural language document data object is selected from a plurality of candidate natural language document data objects,
each candidate natural language document data object is associated with a corresponding cross-document similarity measure with respect to the first natural language document data object, and
the predictive output describes a ranking of at least a subset of the plurality of candidate natural language document data objects based at least in part on each corresponding cross-document similarity measure.

17. One or more non-transitory computer-readable storage media including instructions that, when executed by one or more processors, cause the one or more processors to:
generate, using a sentence embedding machine learning model, a plurality of sentence embeddings based at least in part on a plurality of sentences, wherein:
(i) the plurality of sentences comprises one or more first sentences of a first natural language document data object and one or more second sentences of a second natural language document data object, and
(ii) the sentence embedding machine learning model is generated by updating parameters of an initial sentence embedding machine learning model based at least in part on a similarity determination model error measure that is determined based at least in part on one or more similarity determination model outputs of a sentence similarity determination machine learning model;
determine, using the sentence similarity determination machine learning model, an inferred similarity measure for a sentence pair comprising a first sentence of the one or more first sentences and a second sentence of the one or more second sentences based at least in part on a first sentence embedding of the plurality of sentence embeddings that corresponds to the first sentence and a second sentence embedding of the plurality of sentence embeddings that corresponds to the second sentence;
generate a predictive output based at least in part on the inferred similarity measure; and
initiate a performance of one or more prediction-based actions based at least in part on the predictive output.

18. The one or more non-transitory computer-readable storage media of claim 17, wherein the initial sentence embedding machine learning model is a pretrained sentence embedding machine learning model that is configured to enable retraining the pretrained sentence embedding machine learning model.

19. The one or more non-transitory computer-readable storage media of claim 17, wherein generating the predictive output comprises:
generating a cross-document relationship graph data object having a plurality of sentence nodes and one or more sentence relationship edges, wherein: (i) each sentence node is associated with a corresponding sentence of the plurality of sentences, and (ii) two sentence nodes are associated with a common sentence relationship edge if a corresponding inferred similarity measure for a corresponding sentence pair that is associated with the two sentence nodes satisfies an inferred similarity measure threshold;
generating a cross-document relationship summary data object based at least in part on one or more graph-based inference outputs of performing one or more graph-based inferences on the cross-document relationship graph data object; and
generating the predictive output based at least in part on the cross-document relationship summary data object.

20. The one or more non-transitory computer-readable storage media of claim 19, wherein:
the one or more graph-based inferences comprise a centrality-based page-rank inference that is configured to generate a centrality-based page-rank score for each sentence node; and
the one or more graph-based inference outputs comprise each centrality-based page-rank score.

* * * * *